US008346229B2

(12) United States Patent
Scott

(10) Patent No.: US 8,346,229 B2
(45) Date of Patent: Jan. 1, 2013

(54) SCHEDULING AND DELIVERING AD MEETINGS

(75) Inventor: Sherryl Lee Lorraine Scott, Toronto (CA)

(73) Assignee: Research In Motion Limited (CA)

( * ) Notice: Subject to any disclaimer, the term of this patent is extended or adjusted under 35 U.S.C. 154(b) by 358 days.

(21) Appl. No.: 12/713,929

(22) Filed: Feb. 26, 2010

(65) Prior Publication Data

US 2011/0212711 A1    Sep. 1, 2011

(51) Int. Cl.
*H04M 3/42* (2006.01)
(52) U.S. Cl. .................. 455/414.2; 455/414.1; 455/418
(58) Field of Classification Search ........................ None
See application file for complete search history.

(56) References Cited

U.S. PATENT DOCUMENTS

| | | | |
|---|---|---|---|
| 7,084,758 | B1 | 8/2006 | Cole |
| 7,149,810 | B1 | 12/2006 | Miller et al. |
| 2002/0072972 | A1 | 6/2002 | Lamont |
| 2006/0253453 | A1 | 11/2006 | Chmaytelli et al. |
| 2006/0253454 | A1 | 11/2006 | Chmaytelli et al. |
| 2007/0100690 | A1 | 5/2007 | Hopkins |
| 2008/0262929 | A1* | 10/2008 | Behr ............................... 705/14 |
| 2010/0223093 | A1* | 9/2010 | Hubbard ......................... 705/10 |
| 2010/0293024 | A1* | 11/2010 | Feng et al. ...................... 705/8 |

FOREIGN PATENT DOCUMENTS

| | | | |
|---|---|---|---|
| CA | 2617711 | A1 | 8/2008 |
| CA | 2619232 | A1 | 8/2008 |
| CA | 2619399 | A1 | 8/2008 |
| CA | 2620493 | A1 | 8/2008 |
| CA | 2679560 | A1 | 9/2008 |
| EP | 2026215 | A1 | 2/2009 |
| JP | 2002-318957 | | 10/2002 |
| WO | 2007073584 | A1 | 7/2007 |

OTHER PUBLICATIONS

"Chinese Application Serial No. 201110049676.6, Office Action mailed Sep. 4, 2012", 13 pgs.

* cited by examiner

*Primary Examiner* — Erika A Washington
(74) *Attorney, Agent, or Firm* — Schwegman Lundberg Woessner P.A.

(57) ABSTRACT

A system and method for scheduling advertisement viewing sessions ("ad meetings") and delivering those advertisements to a willing user. An ad meeting is scheduled by a user by creating and storing an ad meeting calendar item and sending a notification to an advertising agent. The advertising agent may select advertisements to send to the user based on the user's specified preferences, location, the time of the meeting, the time of the shopping trip, and/or other criteria. Alternatively, the advertising agent may invite users to an ad meeting by sending an invitation containing an ad meeting calendar item, or alternatively a user may share advertisements with other users by forwarding advertisements or inviting other users to an ad meeting. As an incentive to view advertisements, the user may have credits applied to their communications service provider account based on their advertisement viewing and sharing activity.

20 Claims, 12 Drawing Sheets

FIG. 6E

New Ad Meeting

| | |
|---|---|
| Subject: | Ad Meeting – Trip Specific |
| Ad Agent: | Coupon Mania Inc. |
| Send Ad Meeting Request Using: | Desktop |
| Media: | Website |
| Start: | Thu, Jan 14, 2010 10:00 AM |
| End: | Thu, Jan 14, 2010 10:30 AM |
| Duration: | 0 Hours 30 Mins |
| Time Zone: | Eastern Time (-5) |
| Show Time As: | Busy |
| Reminder: | 15 Min. |
| Send Meeting Request Using: | Desktop |
| Invited: | Jane Smith |
| Recurrence: | None |
| Credits: | 10 |
| Mark as Private: | Yes |
| Notes: | |

FIG. 6D

Ad Meeting Details

| | |
|---|---|
| Subject: | Ad Meeting – Focus Group |
| Ad Agent: | Coupon Mania Inc. |
| Media: | Website |
| Start: | Thu, Jan 14, 2010 5:00 PM |
| End: | Thu, Jan 14, 2010 6:00 PM |
| Duration: | 1 Hours 0 Mins |
| Time Zone: | Eastern Time (-5) |
| Show Time As: | Busy |
| Reminder: | 15 Min. |
| Recurrence: | None |
| Organizer: | Brand Awareness Forum |
| Credits: | 30 |
| Mark as Private: | Yes |
| Notes: | |

SCHEDULING AND DELIVERING AD MEETINGS

TECHNICAL FIELD

The present application relates to a system and method for viewing advertisements.

DESCRIPTION OF THE RELATED ART

Computers and modern mobile communication devices (collectively "communication devices") such as Personal Digital Assistants (PDAs) and smartphones are widely used today for many purposes including personal information management, communication and entertainment.

As communication devices and telecommunications technologies have become widely accessible to and adopted by the public, commercial enterprises have sought means to exploit these mediums for marketing purposes, particularly for advertising.

Conventional means of on-line advertising such as banner ads displayed on webpages have the disadvantages of being potentially ignored and viewed as a nuisance or distraction from the user's task at hand. There remains a need for effective presentation of advertisements.

BRIEF DESCRIPTION OF THE DRAWINGS

In drawings which illustrate by way of example only embodiments,

FIGS. 6A through 6E are exemplary screenshots of calendar views on a mobile communication device.

DETAILED DESCRIPTION

The embodiments described herein provide a system and method for scheduling advertisement viewing sessions (called "ad meetings") and delivering those advertisements to a user. The word "viewing" is used herein to refer not only to the act of looking at or visually perceiving an advertisement or message, but also to other acts of sensory perception of advertisements or messages, such as listening to an audible message or sensing vibrations or tactile signals generated by a communication device, and is herein used interchangeably with the word "perceiving". Thus, the advertisement "viewing" sessions or ad meetings described herein may also be considered to be advertisement "perceiving" sessions. The embodiments will be described in relation to a communication device, such as a mobile communication device, having one or more user interfaces for presenting information to a user of the device, such as a screen for displaying content within a graphical user interface, a speaker and/or headphones or earphones for generating sounds audible to the user, and a vibratory and/or tactile interface for generating human-perceptible vibrations or tactile communications such as Braille messages. It will be appreciated by those skilled in the art, however, that this description is not intended to limit the scope of the described embodiments to mobile communication devices. The methods and systems described herein may be applied to any appropriate communication or data processing device capable of communicating over a network, whether portable or wirelessly enabled or not, including without limitation cellular phones, smartphones, wireless organizers, personal digital assistants, desktop computers, terminals, laptops, tablets, handheld wireless communication devices, wirelessly-enabled notebook computers and the like. For ease of reference, the description below will generally refer to visually perceptible advertisements and ad meetings, but as noted above, the embodiments described herein should not be considered to be limited to visual advertisements.

Figure 1:
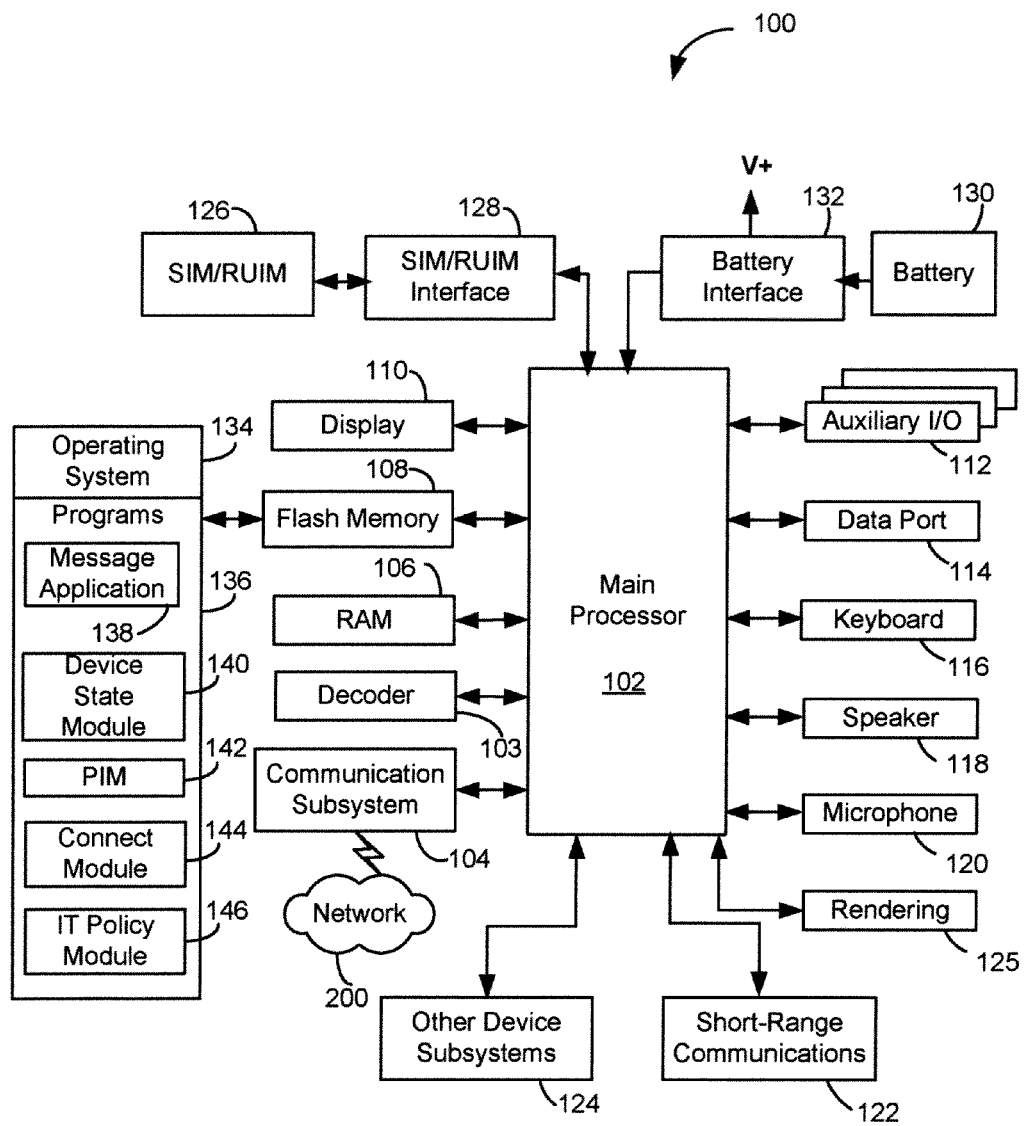
FIG. 1 is a block diagram of an embodiment of a mobile device.
Figure 2:
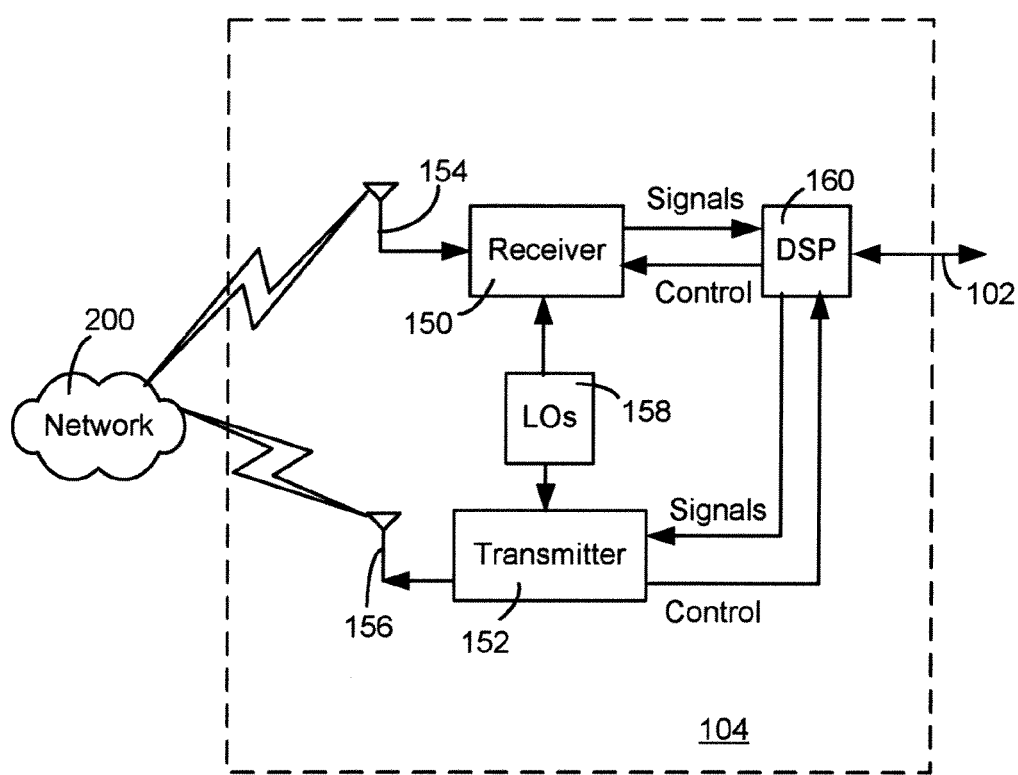
FIG. 2 is a block diagram of an embodiment of a communication subsystem component of the mobile device of FIG. 1.
Figure 3:
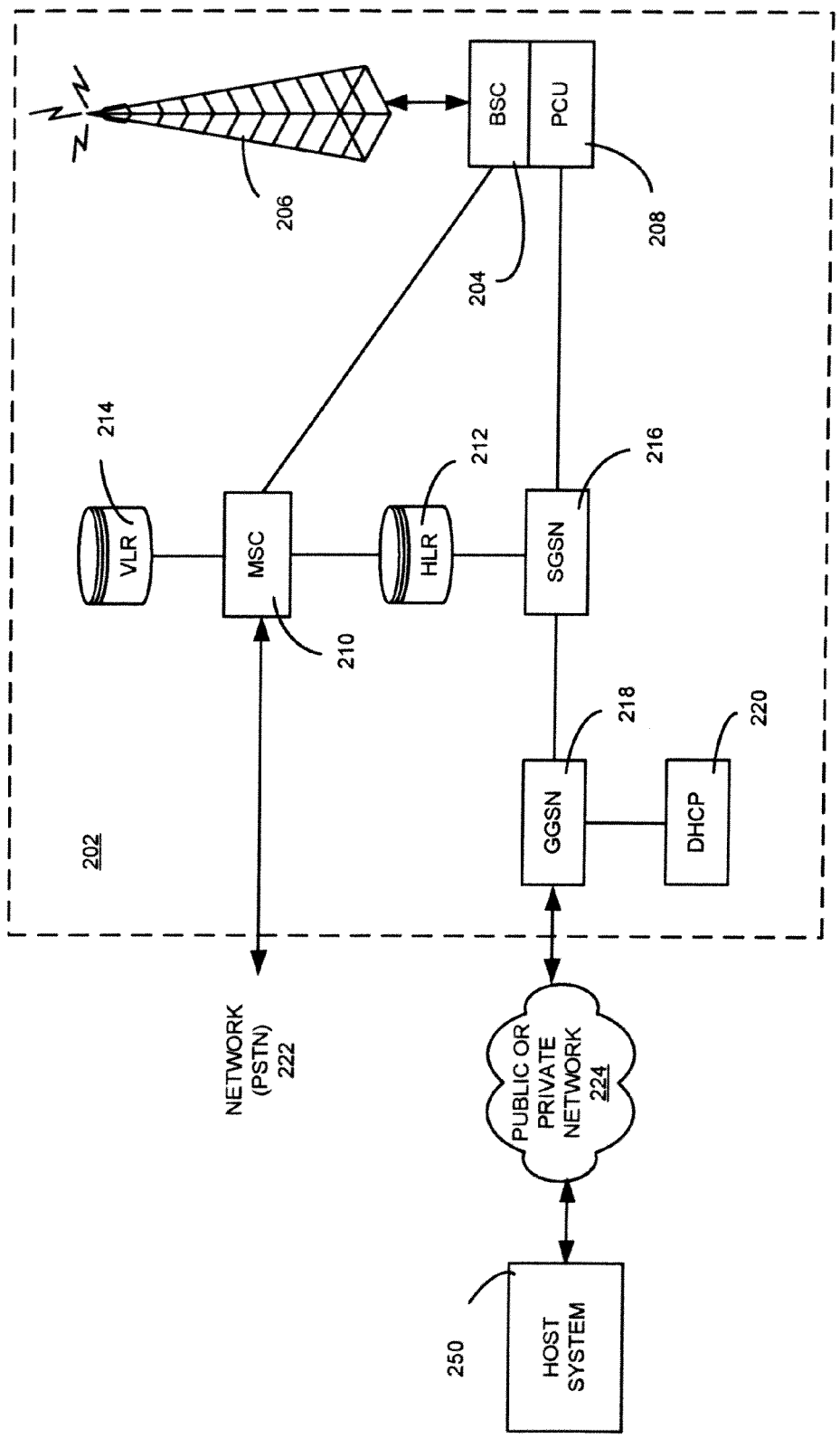
FIG. 3 is an exemplary block diagram of a node of a wireless network for use with the mobile device of FIG. 1.
Figure 4:
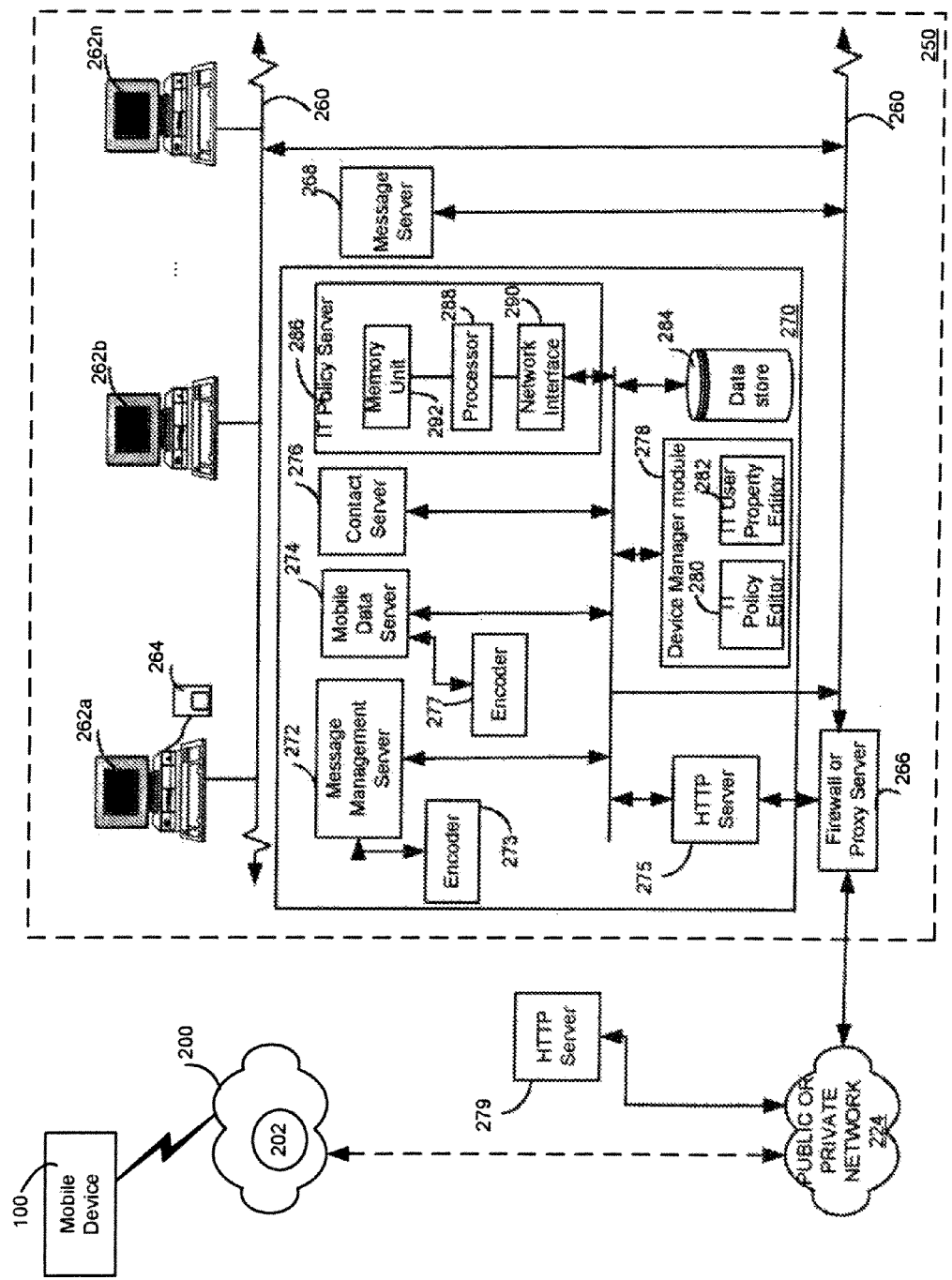
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future.

The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. Auxiliary input/output subsystems 112 may include other interfaces for outputting sound, such as headphone or earphone jacks for use with headphones or earphones, vibratory modules for generating vibrations in the communication device 100, and tactile interfaces for generating tactile communications. Other device subsystems 124 may include voice synthesizer modules for use with other subsystems 112 for conveying information to the user. Another device subsystem 124 may be a Global Positioning System (GPS) module or another type of locational technology for determining the approximate geographical position of the communication device 100, which may operate in conjunction with network-based positioning technology.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering circuit 125 may be implemented as hardware, software, or as a combination of both hardware and software.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, media players, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication.

The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. If a touchscreen is provided on the communication device 100, then the operating system of the device 100 may provide a "soft" or virtual keyboard, comprising graphic user interface elements actuatable via the touchscreen. The virtual keyboard may be used in place of, or in conjunction with, a physical keyboard. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes abuse station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Rendering data files originally optimized or prepared for visualization on large-screen displays on a portable electronic device display often requires additional processing prior to visualization on the small-screen portable electronic device displays. According to an embodiment, this additional processing is accomplished by the rendering engine 125 shown in FIG. 1. As will be appreciated by those of skill in the art, the rendering engine can be implemented in hardware, software, or a combination thereof, and can comprise a dedicated image processor and associated circuitry, or can be implemented within main processor 102.

Figure 5:
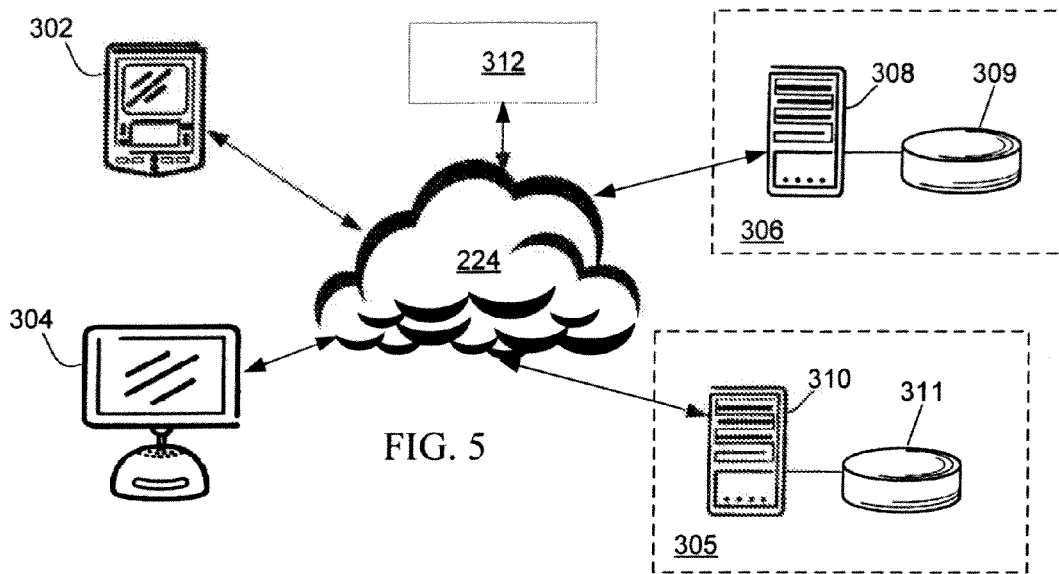
FIG. 5 is a schematic representation of a system incorporating a communication device, an advertising agent and a communications service provider.

The embodiments described herein are described in the context of one or more communication devices 100 in communication with one or more advertising agents over a network. A simple embodiment is shown in FIG. 5. The advertising agent 306 may be operated and managed by a party advertising its own products and services or a service provider advertising the products and services of its customers. Advertising agents 306 may comprise one or more servers 308 for communication with communication devices such as mobile communication devices 302 or personal computers 304, referred to herein as communication devices 100. Where a plurality of servers 308 are employed, each server 308 may carry out the same or different tasks, such as handling application program interface calls from client applications, or handling requests received from customers to make advertisements available to users. The servers 308 may be in communication with one or more databases 309 storing advertisements and related data, and user information. It will be appreciated that the function of a single server may be distributed across a plurality of servers. As such, use of the term "server" herein may refer to a single server or a plurality of servers.

Advertisement and related data are supplied by advertisers 312. In an exemplary embodiment, advertisers 312 may set up advertiser accounts with advertising agents 306 by completing an online questionnaire to create an advertiser profile. Password protected access may be provided by the advertising agent 306 for advertisers 312 to view and change their profile.

Once an account has been set up, an advertiser 312 may send advertising materials and related data to the advertising agent 306 via any known means of transferring data across a network, such as public shared network 224. For example, the advertiser may access the advertising agent's web portal where the advertiser may be prompted to upload an advertisement and to provide data related to the advertisement. Each advertisement may be uniquely identified by an assigned number or by any other means. The advertisement may be provided and stored in any number of formats, including but not limited to a text message (such as an SMS message), a URL, an HTML page, a graphic, an audio file, a video file, or another file format that can be rendered by an input/output subsystem 112 of the device 100. Advertisers 312 may also provide data to be associated with each advertisement, such as the category of the product or service advertised, the geographic location to which the advertisement applies or the applicable store names and locations, and the time period the advertisement is to be run. The advertising agent 306 may require advertisers 312 to pay a fee for service (by electronic transfer of funds or otherwise) to store advertising materials and to distribute the advertisements to users.

User information stored by advertising agents 306 may comprise user-supplied identification information and may also comprise user preferences and scheduled ad meetings, described below. User information may also comprise information collected about the user's ad viewing history, such as the number of advertisements viewed and the time spent viewing or perceiving advertisements.

In one embodiment, users may register with one or more advertising agents 306 by setting up ad viewing accounts with each advertising agent 306. Registration with an advertising agent 306 may include creation of a user profile, for example by completing an online questionnaire. The advertising agent 306 may also provide user access to view the status of their ad viewing account and change their profile online, for example by password protected access to the stored user information. While user registration may be carried out in a web-based, online transaction between the advertising agent 306 and the user over the network 224, registration may take place using other communication means, such as via e-mail or over the telephone. Further, the advertising agent 306 may delegate registration and management of the user's profile to a communications service provider 305 associated with the user so that the user profile data may be stored in a database 311 at the communications service provider 305, and the user may interact with a server 310 in communication with the database 311. In some embodiments, the advertising agent 306 and the communications service provider 305 may be the same entity or related entities. The following description describes an independently operating advertising agent 306 and communications service provider 305, but it will be understood by those skilled in the art that the advertising agent 306 and communications service provider 305 functions described herein may be carried out by the same party. It will also be appreciated that any other means known in the art for collecting the necessary information to set up an account, and for updating and storing the user profile information associated therewith, may be used.

The advertising agent 306 may identify each user by a unique or quasi-unique identifier, such as the user's e-mail address or another communications address such as a telephone number, or alternatively by a user account number or identifier associated with the advertising agent, by the user's communications service provider account number, or a combination of such user information. Where users are provided with online or other access to their user information, any user-supplied or otherwise assigned passwords are stored and associated with each identifier. The user may be required to provide the password to access the user information stored in the database 311. This same password may also be used by the user to obtain further goods or services as a result of the advertisements viewed, as described below.

In addition to user identification information, the user profile may also comprise information such as the telephone number or communications service provider account number to which the user wishes to associate their ad viewing account, if that information is not used as the identifier; the user's preferences as to the type and form of advertisements they are most interested in viewing; and, the user's shopping preferences, such as whether the user prefers to shop online or in-person, and in the latter case, the location of stores, malls or plazas frequented, and the user's favourite brands and merchants.

In the embodiments described herein, to provide users with an incentive to view (or otherwise perceive) advertisements that may be delivered to the user's communication device 100, users may be credited for the time they spend viewing advertisements, and additionally or alternatively for the number or type of advertisements viewed. Users may also be credited for the advertisements they "share" with other users, for example based on the number of invitations they send to other users to view particular advertisements or ad meetings, and additionally or alternatively for the number of advertisements they forward to other users. Credit for sending invitations or forwarding advertisements or ad meetings to other users may only be granted if it is determined that the recipient users actually viewed (or otherwise perceived) the advertisements. The credit may be assessed in abstract credit units, in minutes, or currency equivalent; for example, for each minute of basic advertising delivered and viewed by the user, the user may be credited the equivalent of one minute or some other amount of time, which may be greater or less than one minute; or, the user may be credited in the equivalent of currency, where for example one minute of basic advertising viewing is equivalent to 0.05 dollars or some other predetermined amount, although the user may not be able to redeem the credit for cash. If the credit is redeemable in different ways, the credit may be measured in points or units, where for example one minute of viewing basic advertising is credited a predetermined number of credit units. The credit granted to the user may be redeemable in a variety of ways; for example, the credit accumulated by a user may be applied to the user's billing account with the communications service provider for voice or data services. The user may receive a discount on voice or data services if a predetermined level of credit is achieved or maintained; or, the user may be eligible to receive enhanced services, such as extra minutes on a voice or data plan, voicemail, or short message service (SMS), at a discounted rate or for free. Alternatively, credit may be redeemable for other goods and services such as with customer loyalty programs, which are known in the art. In a further embodiment, voice and/or data communication may be provided to the user for free, provided the user maintains a minimum level of credit (for example, greater than zero or some other predetermined amount). When a user's credit falls below the minimum level, communications services may be terminated by the communications service provider, although emergency calls and advertisement viewing may still be permitted. In order to regain access to other communications services, the user may either purchase credits, earn credits by attending ad meetings and viewing ads as described below, or changing to a different account model in which the user pays for access to the voice and/or data services. For these purposes, a user's ad viewing account would be associated with their communications service provider account (by telephone number, account number or otherwise) so that the user's credit could be correlated with the user's account at the communications service provider 305.

The user may specify the type and form of advertisements the user is interested in viewing in the user's profile. The user may be presented with a menu of options to select advertisement categories. For example, options for the types of goods and services for which the user wishes to view advertisements may include categories of goods and services, such as household appliances, clothing, toiletries, stationary, etc. and may further include subcategories such as children's wear, men's wear or ladies' wear for clothing, and even further subcategories within each subcategory. Categories and subcategories may be as general or as specific as the advertising agent 306 desires to make available. Users may also be given the option to choose one or more formats in which they wish to view advertisements. The formats may include any electronic means available for communicating information to the user at the communication device 100, including, but not limited to, SMS, webpages, audio, video, interactive video or Flash technology, or e-mail. A user may, for example, wish to receive e-mail notification pointing him or her to a webpage to view the advertisements. The webpage may be customized to the user's preferences. The user may also wish to avoid audible advertisements, because the user may be planning to view the ads in a public area where others may be disturbed, or may not wish to receive streamed video because the user tends to view ads when in an area served by a slower data network. These preferences may be configured and stored in the user's profile.

In addition to format preferences, the user may specify one or more addresses for receiving advertising data. For example, for SMS advertising messages, a telephone number is provided; for advertisements sent by e-mail, an e-mail address; if advertising data is to be transmitted from the agent 306 to the communication device 100 over a wireless network, but not packaged as e-mails or other such message formats, the profile may include address information for the communication device 100 itself, such as an IMEI or MAC address.

The user profile may also be configured to store a list of the user's contacts, to which the user may wish to forward ad meeting invitations or advertisements. The addition of recipient contacts to a user's profile may be carried out in an open method, in which the user may enter the contact address (e.g., an e-mail address or phone number) of any recipient, or in a closed method, in which the user is only permitted to add as recipient contacts other subscribers of the advertising service. The addition of a recipient contact to a user profile may also require the explicit consent of the recipient contact. The addition of recipient contacts to the user's profile may be managed in a manner similar to those known in the art for managing contact lists or "friends" lists in social networking systems.

In order to further personalize the advertisement viewing sessions, the user may be prompted to indicate where he or she prefers to shop, whether it be online or in-person. The user may be presented with fields to specify the name and/or location of the shopping centres frequented and the brands or merchants for whom the user would like to see advertisements. The user may even indicate an intention to shop in a given geographic area on a specific date, or range of dates, for a specific item, and that he or she is willing to dedicate a specified advertisement viewing session to that endeavour so that the advertising agent 306 may deliver advertisements related to that shopping event for the specified advertisement viewing session.

The communication device 100 is provided with a calendar application, which is a PIM application that, upon execution, provides a graphical user interface (GUI) for the user to create and store calendar items. Calendar items represent events such as meetings and appointments. A calendar item typically comprises a collection of data about an event such as the subject, date, time, location and participants of the event, and optionally a reminder time for the event, and is stored in a calendar store at the communication device 100. In some embodiments, the calendar store may be synchronized with the host system 250. Furthermore, the calendar events discussed herein dedicated to advertisement viewing sessions may be synchronized with the advertising agent 306 or the communications service provider 305 to provide a backup for the communication device 100. Calendar items are viewed using a calendar view in the calendar application. Calendar applications therefore serve a function of a conventional agenda or planner by keeping track of scheduled events, and may have additional functionality, examples of which are described herein.

In one embodiment where existing PIM applications, such as Microsoft® Outlook® and IBM® Lotus Notes®, are to be used to schedule and deliver advertisement viewing sessions, an Ad Meeting client application may be installed to facilitate the scheduling and delivery of advertisement viewing sessions. The Ad Meeting client application may be a standalone application invoked when a scheduled calendar event begins, or may be an applet or plug-in configured to work with the existing PIM applications. The Ad Meeting client may be integrated with PIM applications loaded during manufacture or installed later at the discretion of the user.

Upon installation of the Ad Meeting client, the user may be prompted to register with advertising agents 306 if he or she have not already done so, and/or set-up Ad Meeting client profile preferences as described above. In setting up the Ad Meeting client preferences, the user may identify which advertising agents 306 with whom the user has registered if the client is not already configured with this information, and may indicate whether to allow exchanges of data with the advertising agent servers 308 or the communication service provider 305 to keep both the Ad Meeting client and the advertising agent servers 308 up to date with any changes made to the user's preferences. Based on the information supplied by the user upon registration with the advertising agent 306, the advertising agent may to push information to all of the Ad Meeting clients on a user's communication device 100 without the user having to take any action.

The Ad Meeting client facilitates the launch of applications required to play the advertisements at a scheduled ad meeting time, or may play the advertisements itself The client may also facilitate the collection of feedback from the user for transmission to the advertising agents 306 to ensure that the advertisements were viewed and that the user is credited for the time spent viewing the advertisements or the number of advertisements viewed. The client may also permit users to create calendar items for ad meetings and to send ad meeting requests to advertising agents 306. Information about the number of credits remaining in a user's communications service provider account may be pushed directly from the communications service provider 305 to the communication device 100.

Figure 6A:
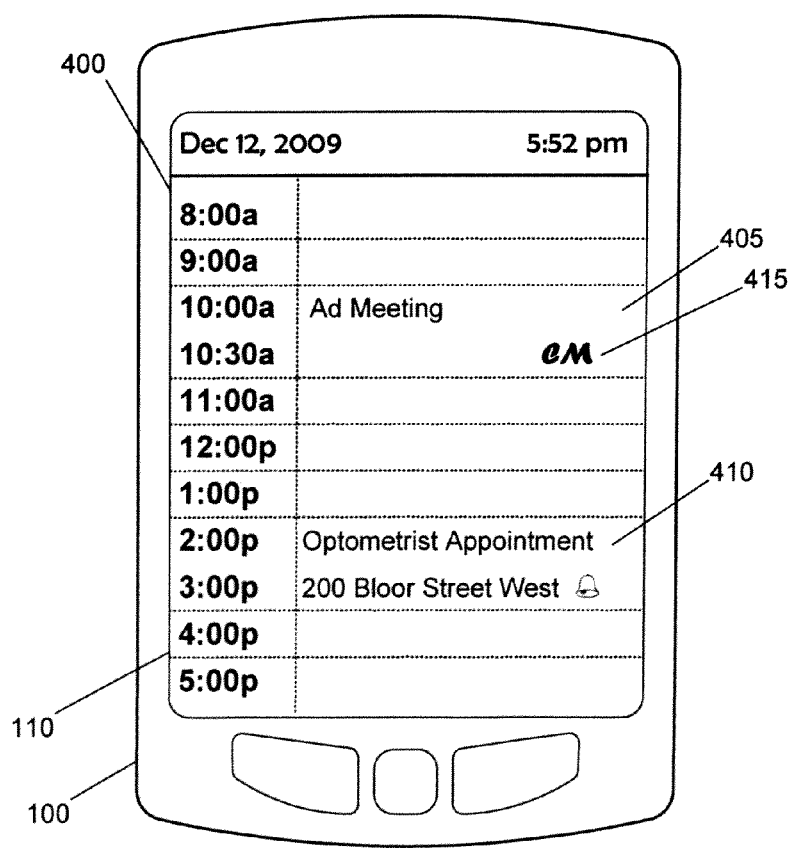

When the user invokes the calendar application, the calendar application may initially display a default calendar view of events scheduled for that day, week, or month, or may simply list upcoming events. FIG. 6A provides an example of a calendar day view 400 displayed on a display 110 of a communication device 100. In the calendar view 400, stored calendar items 405, 410 for events that are scheduled to take place within a time period displayed within the calendar view 400 (8:00 a.m. to 5:00 p.m. in the example shown in FIG. 6A) are displayed on the display 110. Selection of a calendar item 405, 410 in the calendar view 400 results in the display of the particulars of that event. The content of a calendar view 400, or any calendar view, may extend beyond the displayable area of the display 110. For example, the calendar view 400 of FIG. 6A does not show any calendar events past 5:00 p.m. The communication device 100 may be provided with one or more user interface subsystems 112, such as a scroll wheel, track ball, trackpad, or touchscreen configured to receive user commands to scroll through the content of the view 400, so that upon detection of an instruction to pan or scroll through the content of the view 400, other parts of the view 400 are visible on the display.

Figures 6B, 6C:
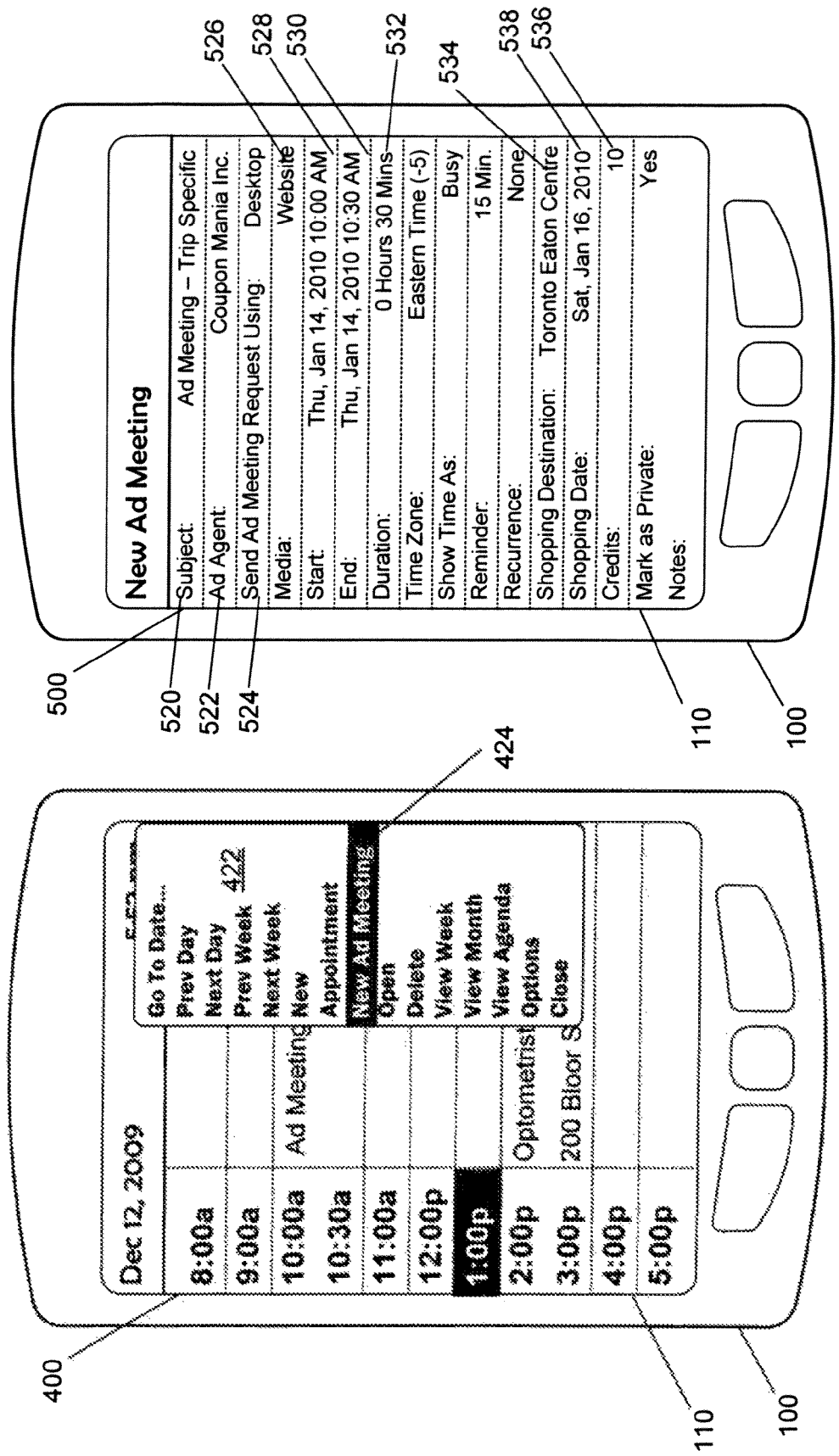

The user may make selections in the calendar view 400 using the interface subsystem 112. For example, the user may invoke a context menu when in the calendar view 400. As shown in FIG. 6B, a context menu 422 is shown, overlaying the calendar view 400. The context menu 422 lists a number of options selectable for configuring the calendar view or for creating new calendar events. One option that may be provided in the context menu is the creation of a "New Appointment", which when invoked causes the calendar application to open a new view for the user to enter data pertaining to a new calendar appointment. A further option may be a "New Ad Meeting" 424, which when invoked provides a new view for scheduling an ad meeting as described below.

Figures 7A, 7B:
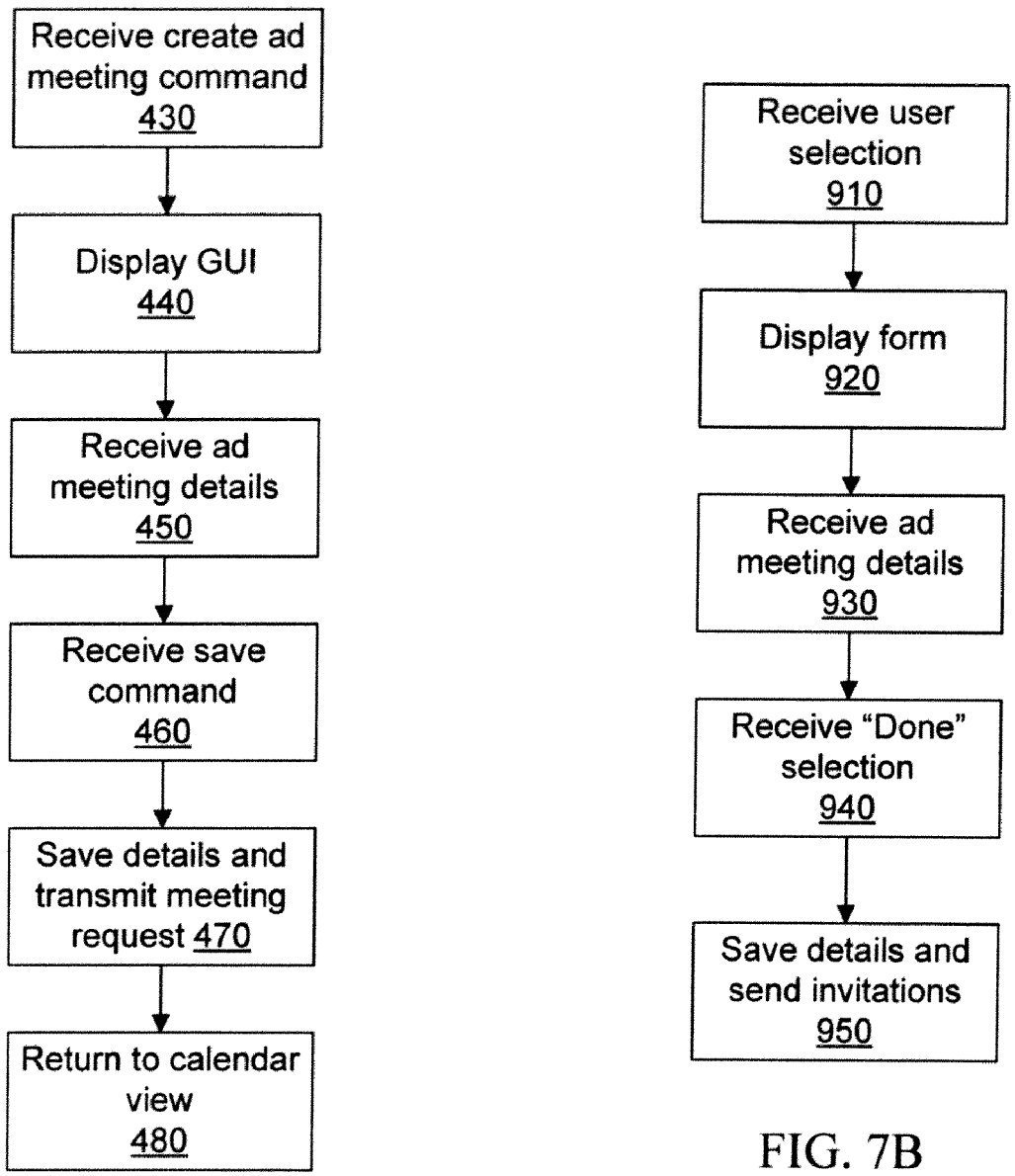
FIGS. 7A and 7B are flowcharts illustrating methods for creating an ad meeting.

A method of creating and storing new ad meeting calendar items will now be described with reference to FIGS. 6C and 7A. Once the calendar application has been launched, the user may invoke a "New Ad Meeting" command. The communication device 100 detects this command to create a new ad meeting at 430 in FIG. 7A. At 440, in response to the command, the calendar application presents a new graphical user interface comprising an ad meeting editing view 500, as shown in FIG. 6C. This new ad meeting view 500 has fields for user entry of ad meeting details, such as the subject 520, the advertisement agent 522, how the ad meeting request should be sent 524, by what media or in what format the advertisements should be delivered 526, start 528 and end 530 times, duration 532, the shopping destination (if any) 534, the anticipated shopping date (if any) 536, and the number of credits allocated to the ad meeting defined in the ad meeting editing view 536. The editing view 500 may also include fields for other data typical of calendar events, such as whether the event is to be marked as private in the user's calendar, and whether a reminder should be issued to the user in advance of the actual start time of the ad meeting.

Returning to FIG. 7A, the calendar application receives the ad meeting details as selected or entered by the user, or alternatively as received from the advertising agent, at 450. In one embodiment, the user may populate some or all of the fields 520 through 536. For example, the user may populate the subject 520 field by selecting an entry from a context menu of options identifying different categories of ad meeting types, such as "Ad Meeting—General", "Ad Meeting—Shopping Trip Specific", "Ad Meeting—Location Specific" or "Ad Meeting—Focus Group". The nomenclature used to describe these various categories may of course vary; the category names may reference one or more of the categories or subcategories of goods and services the user may have previously identified as being of interest in the user's profile. Thus, the options presented in this context menu may be pushed down to the communication device 100 from the advertising agent 306. Alternatively, the user may enter a descriptor or keyword as the subject, and then invoke a search feature that queries the advertising agent 306 for a suitable ad meeting category. For example, if the device 100 detects entry of a character string such as "shoes" in the subject field, the device 100 may initiate a search, for example by transmitting a query with the character string to the agent 306. The device 100 may then receive from the agent 306 a list of categories and subcategories from which the user can choose, such as "children's shoes", "ladies' shoes", and "athletic shoes". In other embodiments, the subject of the ad meeting 520 may be automatically determined by the advertising agent 306 according to one or more factors, such as time of day or geographic location of the user as determined by the location of the communication device 100, or according to other options entered in the new ad meeting view 500. For example, a specific shopping date 544 is specified, the subject field may be automatically populated with "Ad Meeting—Trip Specific". The advertising agent 306 may refer to the shopping destination defined in the destination field 534 to determine which ads to transmit to the communication device that are relevant to the specified destination, rather than to one specific product or type of product.

Where the user registers with more than one advertising agent 306, the user may specify which advertising agent 306 they wish to schedule an ad meeting with in the "Ad Agent" field 522. The user may select from a menu of options listing the advertising agents 306 with which they have registered.

Where more than one messaging account is associated with the communication device 310 (for example, a work-related e-mail account, a home-related e-mail account, SMS, and so on), the user may also specify in the send ad meeting request field 524 which messaging account is to be used to send the ad meeting request by selecting from a menu of messaging functions available on the communication device 100. The recipient of the ad meeting request created in this view 500 will be the advertising service 306. In still other embodiments, the user may elect to invite one or more of the user's contacts to participate in the ad meeting, although these other contacts may be expected to view advertisements on their own communication devices.

The media or format in which the advertisements are to be delivered for the ad meeting may be specified in the field 526. The format may be specified by the user. For example, the user may wish to receive advertisements in the form of SMS messages if he or she intends to view the advertisements of that meeting on a mobile communications device 302, whereas he or she may wish to receive video advertisements if they intend to view the advertisements of that meeting on their personal computer 304, or while travelling on public transit and listening to the advertisements using earphones. As noted above, the data populating the fields 520 through 536 may be provided by the advertising agent 306. In one embodiment, data may be automatically provided by the communication device 100 or the client on the device 100, or the advertising agent 306 may transmit data to populate the fields while a new ad meeting is being created. In an alternate embodiment, some information, such as the media or format type, may not be specified at the communication device 100 at all, but may be configured by the advertising agent 306, for example based on other parameters, such as the subject 534, start or end times 528, 530, or other information relating to the ad meeting.

The user may specify one or more of the start 528 and end 530 times, the duration 532, and the credit value 536 associated with the ad meeting. While the user may specify the duration and the start and end times of the ad meeting, at least some of these parameters may be determined by a value entered in the credit field 536. For example, the user may wish to book an ad meeting that will earn the user 10 credit units. The user may specify a start time 528 and the credit value 546, and based on this, the communication device 100 may calculate the duration 532 and end time 530 of the ad meeting required to meet this credit value. Alternatively, the user may enter a combination of at least two of start time 528, end time 530, and duration 532, and from these values the communication device 100 may calculate the equivalent credit value and populate the credit field 546. Since the user may wish to earn credits in order to maintain or enhance the communications service offered by the communications service provider 305, the user may have a target credit amount that he or she wishes to earn, so may wish to enter a fixed credit value before entering any further parameters for the new ad meeting in the interface 500. ("Time" as used herein may refer only to a time of day, but may also mean a date and time.)

In other embodiments, the credit value 536 associated with an ad meeting may vary according to other factors besides time or duration. For example, some ad meetings may consist only of the user passively viewing video ads, and clicking confirmation buttons displayed on the communication device display 110 to confirm that he or she did view the ads after one or more ads is played on the device 100. Other ad meetings may comprise more involvement on the part of the user; an ad meeting may require participation in a focus group, in which the user answers questions for the purpose of market research. Participation in these types of ad meetings may entitle the user to more credit than the credit earned for passively viewing video advertisements for the same duration.

The user may also schedule recurring ad meetings, as with regular calendar events. However, the user may have the option of deferring or rescheduling recurring ad meetings, as described below.

Where the user wishes to view advertisements for the purposes of a specific shopping trip, the user may have the option of specifying the shopping destination 534 and the anticipated date for the shopping trip 538, as shown in FIG. 6C. The user may even be provided a field to specify what the user will be shopping for on that trip (not shown). The information in the new ad meeting event, once provided to the advertising agent 306, allows the advertising agent 306 to further personalize the advertisement viewing session for the user to the benefit of both the user and the advertisers.

Returning again to FIG. 7A, once the fields of the new ad meeting GUI 500 have been populated with the appropriate information at 450, the information may be saved, for example in response to a "Save" command received by the communication device 100, as a new ad meeting event at 460. In response to this command, the ad meeting details may be saved as a calendar item in the calendar store at the communication device 100, and an ad meeting request may be transmitted to the advertising agent 306 identified in the ad meeting event at 470. The ad meeting request may include information that uniquely or quasi-uniquely identifies the ad meeting. The ad meeting identifier may, for example, be the user's identifier combined with the date and time the ad meeting request was created. The calendar item 550 may comprise the ad meeting identifier generated by the communications device and which may or may not be viewable by the user in the calendar item view. If the advertising agent 306 does not already store information on the address to which advertising data is to be provided to the user, the ad meeting request may include an address to which the advertising data is to be sent. The new ad meeting GUI 500 is then closed and the user may be returned to the calendar view of FIG. 6A, or another view, at 480. When a calendar view such as the view 400 of FIG. 6A is displayed, a calendar item that comprises an ad meeting event may be displayed to show the advertising agent's logo 415, or some other indicia indicating that the calendar event is an ad meeting event. In another embodiment, the ad meeting details may not be stored in the same manner as a calendar event on the device 100; the ad meeting events may be stored in a separate data store. However, if the ad meetings are stored in the calendar store, they are conveniently retrievable and displayable by the calendar application together with regular calendar events.

The user may modify the details of a scheduled ad meeting in a similar manner that a regular calendar event would be modified. For example, details of an ad meeting may be modified by selecting the ad meeting calendar item to be modified in the calendar view such that the details of the calendar event are displayed, an example of which is shown in FIG. 6D. The user may make changes to modifiable fields as desired, then invoke the "Save" command to save the modifications. The device 100 may then send an update to the advertising agent 306 before returning to the calendar view.

When an ad meeting request is received by the identified advertising agent 306, the advertising agent 306 may record the scheduled ad meeting with the user's information. The advertising agent 306 may transmit an acknowledgement of the meeting to the communication device 100 or to the specified address to confirm that the ad meeting event will proceed. The acknowledgement may comprise the ad meeting identifier that may be used as a reference number by the advertising agent 306 to query its database for information on the ad meeting event. If the ad meeting request comprised an identifier, the ad meeting identifier transmitted by the advertising agent 306 may be the same identifier, although the agent 306 may generate and transmit its own identifier for the ad meeting. At some time prior to the scheduled ad meeting, the advertising agent 306 may push advertisement data, such as the selected advertisement materials or a link to the selected advertisement materials, to the communication device 100. The data transmitted to the communication device 100 may be transmitted in association with the ad meeting identifier, so that the communication device can store the advertising data in association with that ad meeting identifier. In addition, each individual advertisement may be associated with its own identifier, which may also be delivered to the communication device 100.

While the communication device 100 may be configured to receive the advertisement data at the time the ad meeting event is scheduled to begin, it is possible that the communication device 100 may be located in a region without voice or data service at that time; accordingly, the ad meeting client may be configured to receive and store advertisement data delivered to the device 100 in advance of the scheduled time, so that the advertisements are available to the user at the scheduled time. Advance delivery and storage of advertisements may not be available for all formats of advertising; for example, some video may not be downloadable as a single file to the communication device 100, but rather must be streamed to the communication device 100 at the scheduled time.

The advertising agent 306 may select the advertisements to be viewed by the user by matching the user's preferences, as indicated in the user's profile, and the details of the scheduled ad meeting against the advertisement data provided by advertisers 312 to find suitable matching advertisements for delivery to the communication device 100. The advertisement or advertisements to be transmitted to the communication device 100 may be randomly or otherwise selected from the matching advertisements; the number of advertisements selected will depend on the time allocated for the ad meeting, and the time a typical user is estimated to spend viewing each of the selected advertisements.

In addition to users initiating ad meetings, advertisers 312 and advertising agents 306 may also invite users to participate in ad meetings. Such ad meetings may be viewed by multiple parties at or around the same time, and may allow advertisers to gauge customer interest in the advertised product or service, or in the advertiser itself. An advertiser 312 or advertising agent 306 who wishes to schedule such an event (the "organizer") sends electronic invitations to individual users or groups of users. The individuals and groups may be randomly selected from the registered users of the agent 306, or may be registered users identified as likely having an interest in the particular subject matter of the ad meeting. The invitations may be sent to each user by e-mail, in a manner similar to conventional calendar meeting invitations. A calendar file may be attached in e-mails to each invitee for storage in their respective calendar store upon acceptance, also in a manner similar to conventional calendar meeting invitations. The calendar application or the ad meeting client may be configured to automatically transmit a response ("accept" or "decline") once the user has chosen to either accept or decline the invitation. An example of such a calendar item 550 is shown in FIG. 6D.

In the example of FIG. 6D, the invitation is from the advertiser "Brand Awareness Forum" 572, through an advertising agent 306 identified as Coupon Mania Inc. The details of the ad meeting event shows that Brand Awareness Forum is the "organizer" of the ad meeting, although the invitation may have been sent to the communication device 100 by the advertising agent 306. In a further embodiment, the organizer's logo may be displayed in the calendar item view 550. Where the advertisements are only to be played at a specified time, such as for a focus group requiring participation of all invitees at the same time, the "Start", "End", "Duration", and "Time Zone" fields may be fixed such that the meeting cannot be rescheduled by the user. As in the previous example, a credit value 574 is also indicated in the ad meeting event details. The calendar item 550 may also comprise an ad meeting identifier, which may or may not be viewable by the user in the calendar item view. As noted above, the ad meeting identifier may comprise a unique or quasi-unique identifier generated at the communication device 100 or by the agent 306; alternatively, the identifier may be provided by the advertiser and provided to the agent 306 for provision to the communication device 100.

The user may also have the option to invite other users to view an ad meeting that they have initiated or an ad meeting initiated by the advertisers 312 and advertising agents 306. In one embodiment, a context menu of the new ad meeting GUI 500 or calendar item view 550 may include an option to invite other user. Upon selection of this option, the device 100 may display a list of contacts from which an invitee may be selected. The contacts may be retrieved from a data store at the communication device 100, or may be retrieved from the advertising agent 306 from the user's profile. This process may be repeated to add as many invitees as desired. Upon returning to the interface 500, fields appear for each invitee 540 as shown in FIG. 6E.

Once the new ad meeting event is saved at 460, or once invitees have been added to an existing ad meeting event, in addition to a request or update being sent to the advertising agent 306, invitations to the event may be sent to the other invitees. In one embodiment, the device 100 may request confirmation that the invitations are to be sent to the other invitees. The invitations may be sent to the invitees via e-mail or in another suitable format for transmission and reception of calendar items.

Alternatively, an ad meeting for simultaneous viewing by a plurality of participants may be established. In the embodiment outlined in FIG. 7B, upon selecting an option to schedule a new ad meeting 910, a form 920 similar to the GUI of the ad meeting editing view 500 may be displayed, with fields for entry of ad meeting details including a listing of invitees. The fields of the form may be populated, including one or more intended invitees, at 930. Once the fields of the form are populated as necessary, upon detection of a "Done" command or other command signifying completion of the form at 940, the ad meeting request is transmitted to the agent 306 and to each of the other invitees at 950. In a further embodiment, only the agent 306 receives the ad meeting request from the communication device 100, and in turn the advertising agent 306 then transmits meeting invitations for the ad meeting to the invitees at 950. The calendar item stored at the communication device 100 and the invitations transmitted to the other invitees would comprise an identifier for the ad meeting. In still a further embodiment, the user accesses a web-based interface for the advertising agent 306, and generates the ad meeting request at the server; thus, the steps 910, 920, 930, and 940 may be carried out at the server 308.

As with conventional calendar invitations, a calendar file may be attached to the e-mail messages or other types of messages sent to invitees for storage in their respective calendar stores at their respective communication devices upon acceptance. The calendar application or the ad meeting client of the recipient communication device may be configured to automatically transmit a response ("accept" or "decline") once the invitee has chosen to either accept or decline the invitation. The invitee's acceptance or refusal of the ad meeting invitation may be transmitted to the sender of the invitation, which may be the advertising agent 306 or the sender at the communication device 100. If the invitee's response is received at the communication device 100, then the communication device 100 may be configured to automatically transmit the acceptance or refusal to the advertising agent 306, so that the advertising agent 306 may maintain a record of the invitees who are expected to participate in the ad meeting.

Where the ad meeting does not have a "Start", "End", "Duration", and "Time Zone" that cannot be changed, the user may have the option to specify that the ad meeting is to be viewed by the user and all invitees (collectively the "participants") simultaneously (not shown). An ad meeting to be viewed by all participants simultaneously may not be capable of being rescheduled by any individual invitee. However, invitees may propose a new time for the ad meeting and the user would then be able to reschedule the ad meeting (as with conventional calendar items) and an update would be sent to the advertising agent 306. Invitees may modify fields that need not be the same for all participants, such as whether or when a reminder is desired.

As participants have ad meeting details containing an identical ad meeting identifier recorded by the advertising agent, identical sets of advertisements are pushed or otherwise sent to each of the participants' communication devices as described below.

In the event that a user attempts to schedule an event for the same time as a previously scheduled event, whether shown as busy or tentative, the calendar application may determine that there is a conflict and may display a message warning the user of the conflict.

Figure 8:
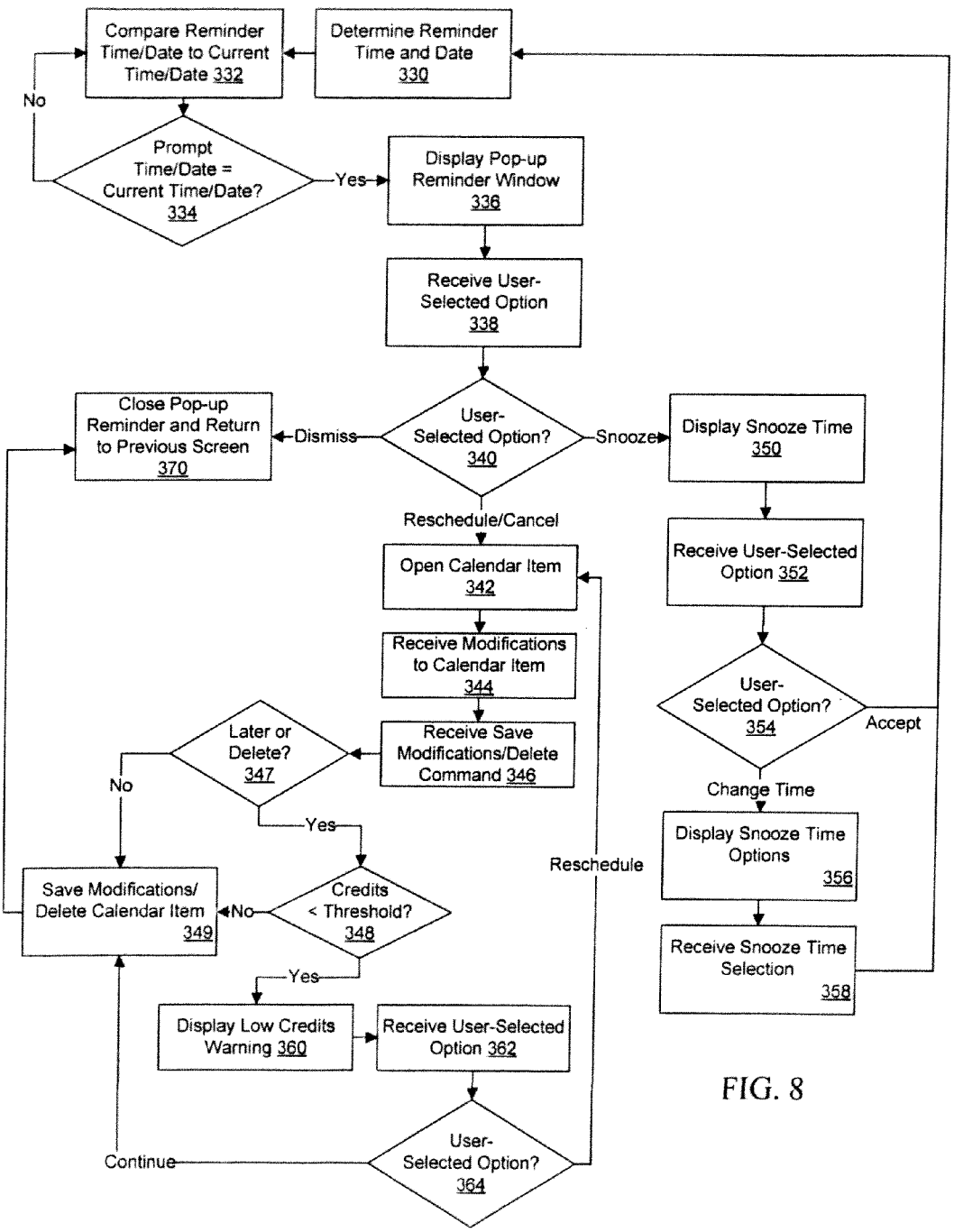
FIG. 8 is a flowchart illustrating a method for reminding a user of an upcoming ad meeting.
Figure 9:
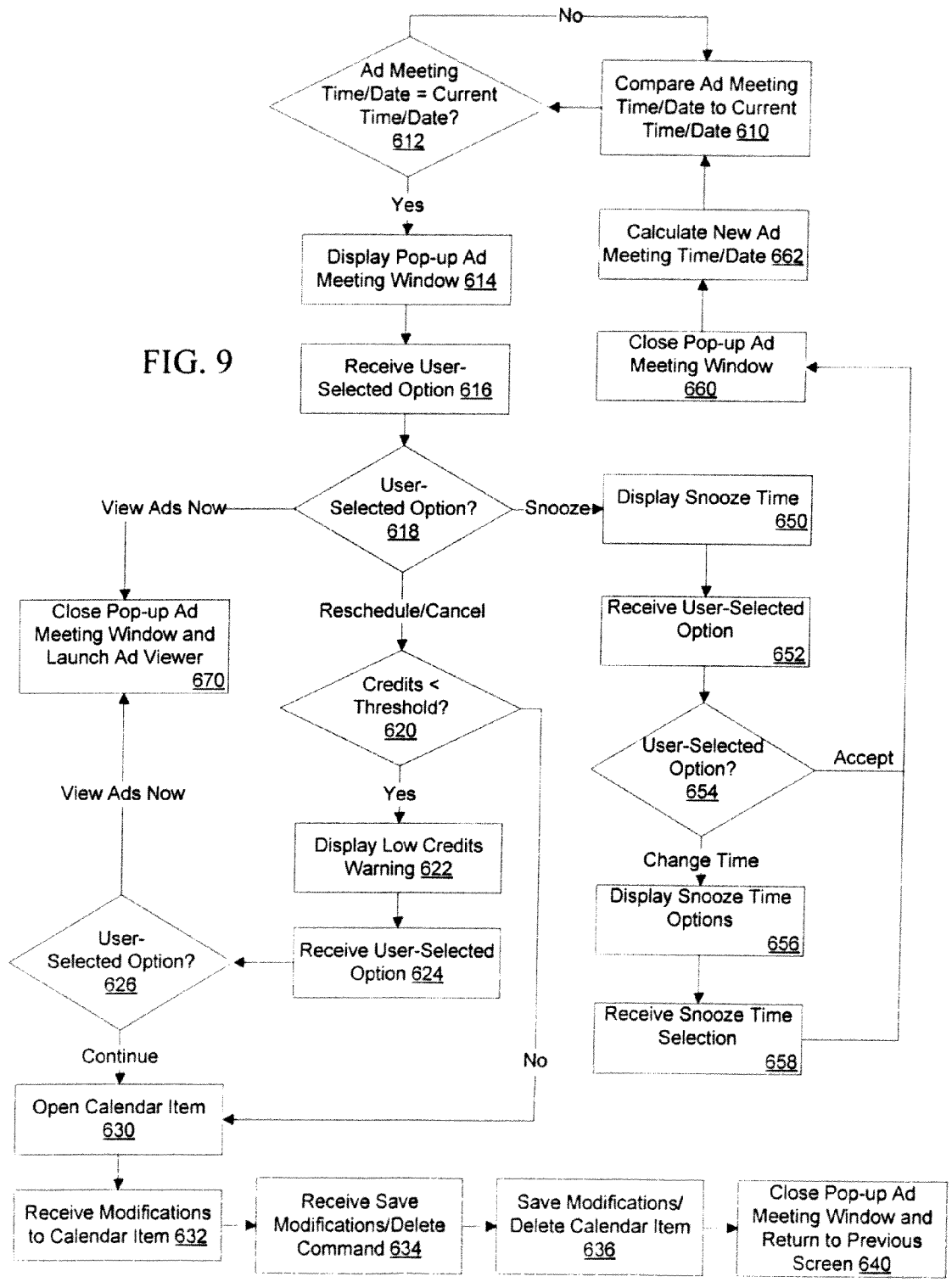
FIG. 9 is a flowchart illustrating a method for handling an ad meeting.

The ad meeting invitation, either when composed by the user or received at the communication device 100, may include a reminder time. At a preset time in advance of the event, the communication device 100 may display an alert to the user, reminding him or her of the upcoming ad meeting event. The reminder may be set at the user's option, or it may be automatically included in the invitation. A method for scheduling and rescheduling an ad meeting event is illustrated in FIG. 8. At 330, a reminder time is determined. This time may be set by the user, or by the advertising service 306. Next, at 332, the device 100 monitors for upcoming events and reminders. The identified reminder time is compared against the current time at 334. If the current time is not equal to the reminder time, the process may return to the comparison step 332. If the current time is equal to the reminder time, a pop-up reminder window may be displayed on the display 110 at 336. The reminder may be accompanied by other indicia or user interface activity at the communication device 100, such as a flashing LED, an audible alarm emitted from the speaker 118, or a kinetic reminder such as a vibration from a vibratory device comprised in the communication device 100. The reminder window may include a brief description or identifier of the ad meeting event, such as the subject, advertising agent, media, and start and end times; the reminder may also include user-selectable options to "Dismiss" the reminder, "Reschedule/Cancel" the ad meeting, or "Snooze" to be reminded again of the selected item at later time. At 338, the device 100 receives a command resulting from the user-selectable options presented in the reminder.

If the command is to "Dismiss" the reminder, the device 100 closes the reminder at 370 and may return the view displayed on the device to a previous screen. If the user selects "Reschedule/Cancel", the ad meeting event item is opened and displayed at the device at 342, so that the user may modify the item as desired, for example by altering the start time of the event to begin later or earlier. Alternatively, the user may choose to delete the event altogether. If user modifications are received at 344 and a command to save the changes is received at 346, or if alternatively a command to delete the event is received, control passes to 347, at which the device 100 determines whether the user has sought to either postpone or delete the ad meeting event. If the new start time is no later than the existing start time, the user has not sought to postpone the event; the calendar item is stored with the modifications at 349, and the reminder, if it is still viewable, is closed and the display on the communication device 100 may return to a previous screen at 370. However, if the new start time is later than the old start time or a delete command is received, the device 100 may then determine whether the user is permitted to do this at this time. As discussed above, the user may be required to maintain a specified credit balance in order to be able to continue using the communication device 100 on the communication service provider's network, so a credit level below a certain threshold may merit a warning to the user.

Thus, at 348, the device 100 determines whether the number of credits held by the user is less than a predetermined threshold. The predetermined threshold may vary depending on the user's command. For example, to discourage deletion of ad meeting events, the user may only be permitted to delete the event if the user's credits are at least at a first level, but if the user is merely postponing the event, the user may only be permitted to delete the event if the user's credits are at least at a second level that is lower than the first level. Alternatively, the predetermined threshold is fixed regardless what the user's actions may be.

If the user has at least the minimum level of credits, then the calendar item is stored with the modifications or deleted at 349, and the process may terminate at 370 as above. If the user has fewer credits than the threshold value, the device 100 may issue a warning to indicate that the user is low on credits at 360. The device may then await a further user command or provide the user with options at 362. If the user does select an option at 364, then if the user instructs the device 100 to proceed with the modification or deletion, this is carried out at 349 as above. If, however, the user chooses to reschedule the ad meeting, the calendar item is opened again for editing at 342. The user may alternatively cancel the modifications, also resulting in the process terminating at 370.

Selection of the "Snooze" option at 340 causes the display 350 of a snooze time on the display 110. In one embodiment, a default snooze time of 5 minutes is automatically selected. Any suitable default snooze time can be set and can be user-selectable. The user is presented with the options of accepting the snooze time or changing the snooze time by selection of either an "Accept" option or a "Change Time" option. At 352, the device 100 receives the user's option, which is evaluated at 354. If the user selected the "Accept" option, then the device re-determines the reminder time at 330 and the process continues from there. If the user wishes to change the amount of time provided for the snooze first, the device 10 displays options for modifying the snooze time at 356, and receives the user's command in this regard at 358. The process then against passes to 330, where the reminder time is recalculated.

Similar functionality may be used if the alert to the user is not a reminder, but an alert that the scheduled ad meeting event has started. Again, the user may have the option to snooze or postpone the ad meeting event, or even to delete it altogether.

Although the functions in FIG. 8 described above presumed that comparisons would be handled by the communication device 100, certain activities, such as evaluating whether the user's credits were below the specified threshold, may be carried out at the advertising agent 306. In a further embodiment, any changes or deletions to a scheduled ad meeting event may be transmitted to the advertising agent 306 for prior approval.

FIG. 12 illustrates a method for determining when an ad meeting time arises and illustrates how the appointment is handled. To determine if an ad meeting start time has arisen, the ad meeting time is compared to the current time at 610. If at 612 it is determined that the current time is not equal to the meeting start time, the process returns to the comparison step 610. If the current time and date is determined to be equal to the ad meeting time and date at 612, an ad meeting window announcement may be displayed at 614 on the display 110 and may be accompanied by other indicators, such as flashing lights, an audible alarm or a kinetic action. The ad meeting window may display an excerpt of the information stored in the calendar store concerning the ad meeting. The ad meeting window may also display a number of user-selectable options, including "View Ads Now", "Reschedule/Cancel" the ad meeting, or "Snooze" to delay commencement of the advertisement viewing session. At 616, the device 100 receives the user's choice. The choice is evaluated at 618. If the user chose to "View Ads Now", then at 670 the ad meeting window announcement is closed, and an ad viewing application is launched. The ad viewing application may be any application capable of displaying the advertising data to the user, such as a browser, a messaging program, a video or audio player, or a graphics display program. The ad viewing application may be independent of or integrated with the ad meeting client.

Selection of the "Reschedule/Cancel" option may cause the ad meeting event item to be opened for editing at 630. However, the device 100 may first determine whether the number of credits remaining in the user's account is at least equal to a predetermined minimum value at 620. If the device 100 does not store information about the user's credits locally, this may be determined by transmitting a query to the advertising agent 306 and receiving a response from the agent 306 concerning the user's credits. The agent 306 may transmit the value of the user's credits to the device 100, so that the device 100 may determine whether the credits are at least equal to the predetermined minimum, or else the agent 306 may transmit a response indicating whether the user's credit is at least equal to the predetermined minimum. If the user does have at least the minimum amount of credits, then the calendar item is opened for editing or for deletion at 630. The user may then modify the calendar item as desired at 632. After such modification of the desired fields, the device 100 detects a "Save" command invoked by the user at 634, or a "Delete" command if the user wishes to delete the ad meeting event altogether. At 636, the device 100 either saves the modified ad meeting event item or deletes it, then closes the ad meeting announcement window if it is still open, then returns to the previous screen at 640.

If the user is determined at 620 to have fewer credits than the minimum amount, a warning to indicate that the user is low on credits may be displayed at 622. The user may then invoke a command at 624, either choosing to continue with rescheduling or cancelling the ad meeting, or to view the advertisements. The command is detected and evaluated at 626. If the user opts to continue with rescheduling or cancelling the ad meeting event, the calendar item is opened 630 for editing of deletion, as described above, and the remainder of the process follows the branch of 620 to 640. If the user elects to "View Ads Now" and not reschedule or cancel the ad meeting event, at 670 the ad meeting window announcement is closed, and an ad viewing application is launched.

Selection of the "Snooze" option at 618 causes the display at 650 of a snooze time on the display 110. In one embodiment, a default snooze time of 5 minutes is automatically selected. Any suitable default snooze time can be set and can be user-selectable. The user is presented with the options of accepting the snooze time or changing the snooze time by selection of either an "Accept" option or a "Change Time" option. At 652, the device 100 receives the user's option, which is evaluated at 654. Selection of the "Accept" option results in the closure of the ad meeting announcement window at 660 and calculation of the new ad meeting time at 662 based on the current time and the snooze time accepted. The process then returns to the comparison step 610. Selection of the "Change Time" option results in the display of a submenu of user-selectable snooze times at 656. Following receipt of a user selection of one of the reminder times at 658, the ad meeting announcement window is closed at 660, and a new ad meeting time is calculated 662.

When the ad viewing application is launched for a scheduled ad meeting, advertisements or links to advertisements pushed to or cached on the communication device 100 for the ad meeting are run—i.e., rendered and displayed, played, etc.—by launching the appropriate application, either within the ad viewing application itself, or separately. The ad viewing application may obtain from the ad meeting event item the reference number used to identify that ad meeting, and then may use that reference number to retrieve from the device's memory any pre-stored advertising data intended for the current ad meeting. Alternatively, the ad viewing application or the ad meeting client may retrieve the reference number from memory of from the ad meeting event item, and then transmit a request to the advertising agent 306 comprising the reference number, to initiate transmission of advertising data from the advertising agent 306 to the communication device 100. Even if the advertising data is stored in memory, the ad meeting client may still transmit a message to the advertising agent 306 comprising the reference number to indicate to the advertising agent 306 that the user has begun to view the advertisements.

If other applications are invoked to view advertising content, these applications may be invoked independently of the ad viewing application; for example, a web browser or movie player may be launched to access non-advertising resources. These applications may also be configured to provide users with the option of commencing an ad meeting event. For example, the application may include selectable options so that when the application is launched, the user is presented with the option of commencing the next scheduled ad meeting event, even if it is not scheduled to occur yet, or to commence a new ad meeting event on an ad hoc basis. If a new ad meeting event is created, the user may be required to specify the types and form of advertisements, and what subject matter is preferred, although this information may be obtainable from the advertising agent 206.

The ad viewing application may provide the user with the option of sorting or filtering the advertisements intended for the ad meeting by product or service type, merchant, or location so that the user may view the advertisements of greatest interest to him or her first. As the advertisements are displayed or viewed, the ad viewing application may automatically track and record how much time the user has spent viewing each advertisement, and which and how many advertisements were viewed. This information may be recorded by the ad viewing application in association with the individual identifiers associated with each advertisement. Alternatively or additionally, the user may be required to provide feedback at various instances throughout the ad meeting to verify their active participation in the ad meeting. For example, where the advertisements are in the form of SMS messages or e-mails, the user may be required to send a generic reply for each advertisement to confirm that the message was at least opened on the user's device. The reply may be automatically configured to include an identifier or reference number so that the reply can be confirmed by the advertising agent 306 as a reply to a particular advertisement from a particular ad meeting. Where the advertisements are in the form of webpages, the user may be required to scroll through content and click on a button, for example near the end of the page, before he or she can proceed to the next advertisement or before the ad meeting can be terminated. Clicking the button may cause a form to be submitted to the advertising agent 306. The form may be configured to comprise identifiers and reference numbers. Where the advertisement is an audio or video file, the user may be prompted by the ad viewing application to answer a question, which is then recorded by the ad viewing application in association with the particular advertisement and the ad meeting reference number. The ad viewing application, through the ad meeting client, may then transmit the collected information, responses and feedback to the advertising agent 306, along with the associated identifiers and reference numbers, so that the user may be credited for viewing the advertisements. The transmission of collected information may be carried out at certain points, such as every time the ad viewing application is closed; at predetermined intervals of time, for example every evening; or after a predetermined number or minutes' worth of advertisements have been viewed. As noted above, different types and formats of advertisements may be awarded different numbers of credits. Also, different limitations may be placed on credits earned in a given way. As an example, credits earned by viewing SMS advertisements may only be applied to the user's account to obtain free text messaging.

The ad viewing application may also provide the user with the option of inviting another user to view a particular advertisement, regardless of whether the other user is registered with the related advertising agent or whether the other user has installed an ad meeting client. The invitation may be an automatically generated e-mail message containing an identifier of the advertisement, or the reference number of the ad meeting. The user may add a personalized message in the invitation to the other user. The user may also save or mark any given advertisement for further review or reference at a later time, and may have the option to view related advertisements.

Figure 10:
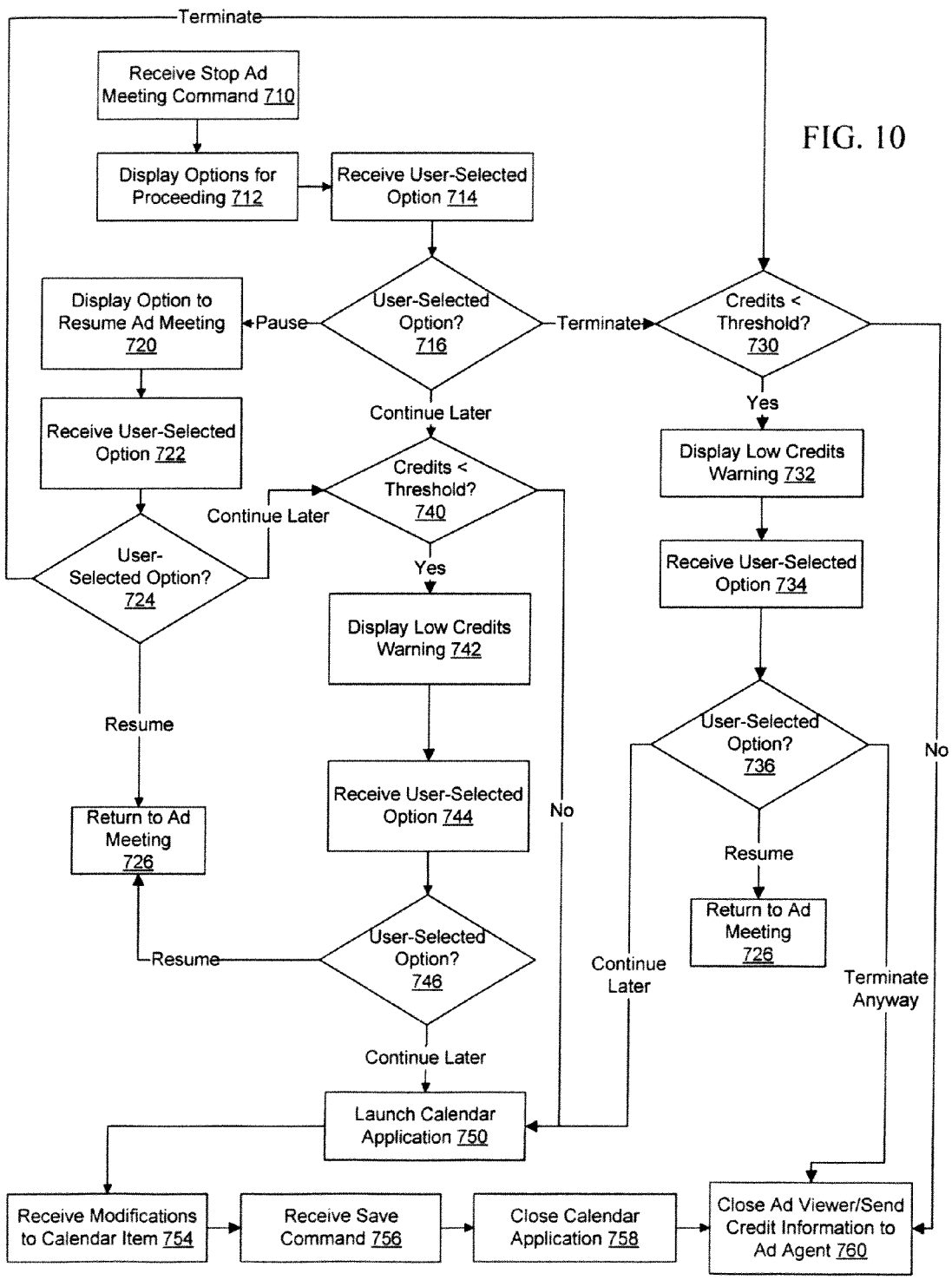
FIG. 10 is a flowchart illustrating a method for terminating an ad meeting.

In further embodiment, while viewing ads in an ad meeting, the user may utilize the ad viewer application to pause or stop his or her review of advertisements and, at later time, return to the advertisements to continue reviewing them. To accomplish this at the device, the advertising agent 306 may transmit a "playlist" of advertisements to be played in a given ad meeting. The ad viewer application may then use the playlist to track the user's process through the advertisements. Turning to FIG. 10, a method for pausing and resuming an ad meeting is described. During the course of an ad meeting, in which the device 100 continues to display advertisements to the user, the device 100 receives a command to temporarily stop advertisement viewing at 710. The user may then be presented with a dialog box or window having the options of pausing the ad meeting, terminating the ad meeting or scheduling the continuation of the ad meeting at 712.

Where the user selects the "Pause" option, advertisements and their playback continue to be paused, and a window is displayed with a control to allow the user to either resume playback at a later time or to reschedule the continuation of the playback at 720. After pausing, the user may switch tasks on the device to another function; for example, the user could pause to respond to e-mail or to make a telephone call. After pausing, the user may invoke a further command at 722. At 724, the command is evaluated by the device 100. If the user command is to "Resume" playback, then the window is closed and the ad viewer application continues to play back the advertisements in the ad meeting at 726.

If the user wishes to reschedule the ad meeting and continue it later, either after pausing or after the temporary stop at 710, the communication device determines whether the user's account has at least the minimum amount of credits at 740. This may be carried out as described above, and may involve communication with the advertising agent 306. If the user's credits exceed the threshold value, then at 750 the calendar application is launched so that the user may edit the ad meeting event item with a new time at 754. The ad meeting event item may retain the same reference number it was previously given by the advertising agent 306. At 756, the communication device 100 receives a "save" command and saves the modifications, then closes the calendar application at 758. The communication device 100 may then close the ad viewer application if it is still executing, although the ad viewer application may compute the additional credits the user may have earned for the partial completion of the ad meeting, and have that data transmitted to the advertising agent at 760. In a further alternative, no credits are added to the user's account until the entire ad meeting has been completed. When the user wishes to resume the ad meeting, he or she may invoke the ad viewer application and select the ad meeting from a user interface within the ad viewer application; the ad viewer application may then query the playlist to determine which advertisements have yet to be shown to the user.

If the user's credits do not exceed the threshold value, then at 742 a warning is issued to the user cautioning that the user's credits are low. At 744, the device then receives a further command from the user, which is evaluated at 746. If the user invokes a "Resume" command, the ad viewer application returns to displaying the various advertisements in the ad meeting at 726. If the user still wishes to continue later, then the process moves to 750, as described above.

The user may also wish to "Terminate" the ad meeting at various points in the process at 716, 724, and 736. If the user wishes to terminate the ad meeting at 716 or 724, the device 100 first determines whether the user's account has at least the required threshold number of credits at 730. If the user's account does have at least the threshold number, then the process terminates. The ad viewer application may determine the number of credits earned by the user, or may report the advertisements viewed by the user, to the advertising agent 306 via the ad meeting client at 760. If, however, the user's account does not have the threshold number of credits, a warning may be issued to the user at 732, and a further user command in view of the warning is received at 734. The command is evaluated at 736. If the command is to "Resume", then the ad viewer application returns to displaying advertisements in the ad meeting at 726. If the user elects to terminate anyway, the process proceeds to 760, described above. If the user elects to continue viewing advertisements later, the process moves to 750, also described above.

The user may also initiate ad hoc ad meetings by creating a new ad meeting as described above with reference to FIGS. 7A and 6C, selecting a start time of "Now". If the user selects "Current Location" for the shopping destination field 534, the communication device 100 will provide the advertising agent 306 with its current location, using either GPS or other locational technology, or by providing information about a fixed location, for example an address supplied by the user. When the combination of "Now" for start time and "Current Location" for shopping destination are selected, the shopping date field 536 will be automatically populated with the current date. The advertising agent may presume that the user is actively shopping when a Now/Current Location combination is received and may commence sending timely advertisements to the user. The advertisements may also be locationally relevant to the user, based on the specified location. For example, where the user is in a shopping mall food court at noon, and requests an ad meeting, the advertising agent 306 may transmit advertisements such as coupons for lunch specials from vendors of the food court that are only valid for that day. The vendor is thereby able to limit the spread of coupons and is better able to target their advertisements, while the user receives information that is useful immediately. The advertising agent 306 may also send advertisements for vendors of the shopping mall based on the user's specified preferences.

Figure 11:
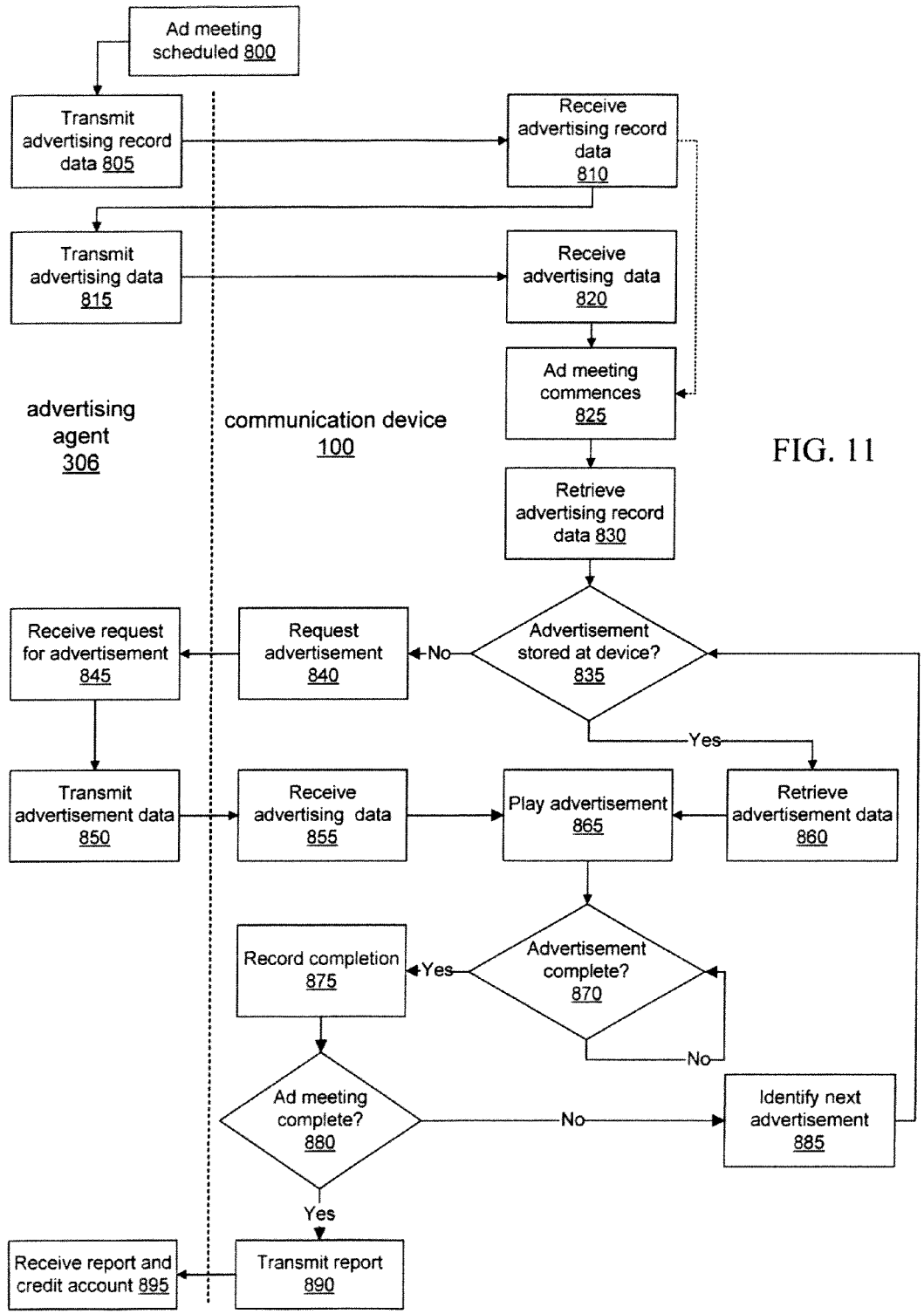
FIG. 11 is a flowchart illustrating a method for delivering advertisements.

Whether the ad meeting for a scheduled time is arranged in advance by the user sending a request to the advertising agency 306 or the agency 306 sending an invitation to the user, whether for an individual user or a group of invitees for a simultaneously viewed ad meeting, or on an ad hoc basis to begin as soon as possible at the user's request, a process of conducting the ad meeting may be carried out in accordance with the process shown in FIG. 11. At 800, the ad meeting event is scheduled at both the communication device 100 and the advertising agent 306. Subsequent to the scheduling, at 805 the advertising agent 306 transmits, or causes to be transmitted, advertising record data to the communication device 100, which is received at 810. If there are several invitees involved in the ad meeting, a similar step may be carried out for each of their respective communication devices as well. The advertising record data may comprise a playlist of advertisements to be played at the communication device 100 during the ad meeting, each identified with an advertisement identifier referencing a record in the advertising agent's database 309. There may be one, two or more advertisements listed in the advertising record data. The playlist may be identified with an identifier as well, which may be the same as the identifier for the ad meeting itself. The advertising record data may be used by the ad viewing application to determine which advertisement is to be played in what sequence during the ad meeting, and to track which advertisements have already been played during the ad meeting. In the case of an ad meeting that was scheduled in advance, the advertising record data may be transmitted to the communication device 100 well in advance of the scheduled start time of the ad meeting. If the ad meeting is an ad hoc meeting, then the advertising record data is transmitted as soon as practicable, once the advertising agent 306 has determined which advertisements are to be delivered to the user. In addition, at 815 the advertising agent 306 may transmit advertising data, comprising the advertisements themselves as video, audio, text, HTML, or other file formats, or instructions on retrieving the advertisements. As noted previously, not all advertisements may be presented in a format making them easily downloadable in advance by the device 100. In that case, the agent 306 may transmit instructions for retrieving the advertisement at a later time. This advertising data is received by the communication device 100 at 820, and stored in memory at the communication device 100. If the agent 306 does not transmit advertising data to the device 100, then the process moves to 825.

The advertisement data may be provided in a previously specified media or format defined in the ad meeting request, or in the user's profile at the advertising agent 306. However, in a further embodiment, either one of the communication device 100 or the advertising agent 306 may determine at the time of the meeting, shortly before the meeting, or at the time of receipt of the advertising record data, what media or format may be used for the advertisements. For example, the communication device 100 may determine at or shortly before the time of the meeting or upon receipt of the advertising record data that it is not in a location where multimedia messages or large volumes of data can be received easily or at all, for example because the device 100 is in an area served by an older generation cellular network or because signal strength at the particular location of the device 100 is inconsistent. The communication device 100 may therefore assess the types of media or message transports currently available at that location, and may transmit to the advertising agent 306 an identification of a preferred advertisement format or any unavailable formats for advertising data. The advertising agent 306 may then select appropriate advertisements in appropriate formats for transmission to the device 100, and may transmit updated advertising record data as required to reflect any changes in the selected advertisements as a result of the identification of the preferred or unavailable formats.

Next, at 825, the ad meeting commences. This step may involve a determination made by each communication device's operating system, calendar application (which may issue an alert to the user), and/or by the ad viewer application that the start time for the ad meeting has occurred. The commencement may comprise the ad viewer application launching on the communication device 100. In the case of the user recommencing or reprising a previously paused or rescheduled ad meeting, or in the case of an ad hoc meeting, the user may manually launch the ad viewer application by selecting the application for launch at the device 100. Also in the case of an ad hoc meeting, the ad viewer application may automatically launch upon receipt of the advertising record data. Otherwise, the ad viewer application may automatically launch at the scheduled time when the operating system or a task manager determines that it is time for the application to launch. At this point, the ad viewer application may optionally alert the user to the commencement of the ad meeting, and provide the user with the opportunity to pause, terminate, or reschedule the ad meeting.

The ad viewer application then retrieves the advertising record data at 830 to determine which advertisement is to be played first at the communication device 100. From the advertising record data, the ad viewer application determines the identifier of the first advertisement to be played, and at 835 then determines whether the data for that advertisement (e.g., the audio, video, HTML, or other file) is already stored at the device 100. If it is, the ad viewer application retrieves the advertising data at 860, and plays the advertisement at 865. If the data is not already at the device 100, then at 840 the device 100 transmits a request for the advertisement to the advertising agent at 840. The agent receives the request at 845, and responds by transmitting or causing to be transmitted the advertisement data at 850. The data is received by the communication device 100 at 855, and the device 100 plays the advertisement at 865. If the advertisement comprises streaming video or other content that must be transmitted to the device 100 while the content is played, further repetition of steps 850 to 865 may occur, with further requests for data 840 transmitted from the communication device to the agent 306 as necessary.

Once it is determined that the playing of the advertisement is complete at 870, the ad viewer application records completion of that advertisement at 875. A determination is then made whether the ad meeting is complete, meaning that there are no further advertisements to be played according to the advertising record data. If the ad meeting is not complete, the ad viewer application identifies the next advertisement to be played at 885, and the process returns to 835. If the ad meeting is determined to be complete at 880, then a report is transmitted to the advertising agent 306 at 890. The report may comprise a confirmation that the ad meeting is complete, and/or a confirmation of which advertisements had been viewed. As noted above, if an ad meeting is terminated prematurely, a report may still be transmitted to the agent 306 indicating which advertisements had been viewed. The report is received by the agent 306 at 895, and the agent 306 may then proceed to record a credit against the user's account. In the case of a simultaneous viewing of advertisements in an ad meeting initiated by the user, the user may receive additional credit once the agent 306 receives confirmation that the other invitees had also viewed the advertisements delivered during the ad meeting.

Some advertisement media are easily measured in terms of time. For example, a focus group meeting, which may involve one or more of video, voice, or messaging, may be measured according to the length of the meeting, as may a, electronic chat or instant messaging session; a video or audio file can be measured according to the length of playback. The ad viewer application can assess whether such an advertisement viewing is complete by comparing the length of time spent at the communication device 100 playing back the advertisement against a recorded duration of the advertisement. If credit is awarded to a user based on the minutes of advertising viewed by the user, it is easy to compute the credit for such media. Other media, such as SMS, webpages and e-mail, may be useful as advertising formats, but they do not correspond directly to a measure of time; it may take some users longer to read a message than others, with the same advertising impact. Credit may be awarded to users on a per-unit basis; i.e., for each SMS or e-mail read and confirmed to have been read by the user, a specific number of credits is awarded. Since individual SMS and e-mail messages and the like typically do not consume a great deal of storage space on the communication device 100, the advertising agent 306 may transmit such messages at any time to the communication device 100 for later perusal. Later, when an ad meeting takes place, the ad viewer application may simply retrieve all such messages from the message stores of the device 100, and present them for the user's perusal. The user may be required to actuate a user interface element to confirm when the message has been read, and the message may be required by the ad viewer application to be displayed on the display 110 for a minimum period of time. In that way, the ad viewer application can then record that the playback of that advertisement was completed. After the messages have been read, they may be deleted unless the user wishes to save them. In a further variant, the user may choose to forward the advertisement to another person. Depending on the format of the advertisement, either the advertisement itself may be forwarded to the user, or a hyperlink or other instruction for retrieving the advertisement may be forwarded. The forwarded content may include the ad meeting identifier, thus providing an association between the forwarded advertisement and the user. If the recipient of the forwarded advertisement plays the advertisement, an advertising viewer application on the recipient's device may monitor the playback of the advertisement, and may notify the advertising agent 306 not only to indicate that the recipient had viewed the advertisement, but also that the advertisement had been provided by the first user. The user may then receive extra credit as a result.

The user may also have the option in the ad meeting calendar item menu to use the communication device 100 to scan or photograph a barcode, to receive a radio frequency signal, or any other means to capture identifying information about a product to populate a preference field in the ad meeting calendar item. The advertising agent 306 could then select advertisements (which may include coupons and/or other promotional materials) relating to that specific product or prepare price comparisons for the user to view in an ad meeting. The combination of product identifying information and the current time and location of an active shopper allows the advertising agent 306 to present the user with advertisements that are pertinent to the user's task at hand. A user who uses a coupon or other advertisement delivered during an ad meeting to make a purchase may submit a proof of purchase to the advertising agent to receive extra credit on the user's account. The submission of the proof of purchase may be done by supplying a copy of the receipt or some identifier printed on the receipt. By capturing the proof of purchases from users, the advertising agent 306 may obtain some measure of the effectiveness of the ad meetings. In a further embodiment, the user may respond to advertisements shown on the communication device 100 during an ad meeting, or during any later playback of the advertisement, by actuating an interface element (for example, a hyperlink displayed while the advertisement is displayed on the communication device 100) to request more information, to make a purchase, or to record an interest in the subject matter of the advertisement. When the interface element is actuated, the advertising agent 306 may be contacted for storage of further information, such as the request for further information, or the recording of the interest. For this purpose, the advertising agent 306 may require the user to log into the service using the password created for that user. In a further embodiment, the advertising agent 306 may provide retail services on behalf of the advertisers, such that users may access the advertising agent 306 online to purchase the items shown in the advertisements. In that case, again, the password may be required to provide the user with access for making a purchase.

It will be appreciated that the method steps described herein are carried out by routines or subroutines of the communication device 100 or other devices. Coding of software for carrying out such steps is well within the scope of a person or ordinary skill in the art.

The systems and methods disclosed herein are presented only by way of example and are not meant to limit the scope of this application. Other variations of the systems and methods described above will be apparent to those in the art and as such are considered to be within the scope of this application.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method for playing advertising content at a communication device, the method comprising:
    establishing a predetermined time for an advertisement event for playing at least one advertisement at the communication device;
    receiving, at the communication device from a server, advertising record data for said advertisement event, prior to the predetermined time;
    receiving, at the communication device, at least one advertisement identified in the advertising record data;
    playing the at least one advertisement at the communication device during the advertisement event at the predetermined time, such that an entirety of said advertisement is played at the communication device; and
    transmitting to the server confirmation that the entirety of said advertisement was played at the communication device,
    wherein the advertising record data comprises an identifier corresponding to said at least one advertisement, and further wherein said at least one advertisement is received in response to a request transmitted from the communication device during said advertisement event to the server, the request comprising the corresponding identifier.

2. The method of claim 1, further comprising forwarding the at least one advertisement to a second communication device from the first communication device, such that the identifier corresponding to said at least one advertisement is provided to the second communication device, and further comprising transmitting to the server confirmation once the entirety of said advertisement has been played at the second communication device.

3. The method of claim 1, wherein the advertising record data and the at least one advertisement are received at a plurality of communication devices, and wherein the playing is carried out at the plurality of communication devices at the predetermined time, and further wherein transmitting comprises transmitting confirmation from at least one of said plurality of communication devices.

4. The method of claim 1, wherein the at east one advertisement is received prior to the predetermined time.

5. The method of claim 1, wherein at least two advertisements are received at the communication device, said at least two advertisements are displayed at the communication device such that an entirety of said at least two advertisements are displayed at the communication device, and further wherein the confirmation indicates that the entirety of each of said at least two advertisements were displayed at the communication device.

6. The method of claim 1, wherein the communication device is a wireless communication device, and a network service is enabled for the wireless communication device if a minimum amount of advertisement is confirmed to have been displayed at the communication device.

7. The method of claim 1, wherein the at least one advertisement is delivered in a format selected from one of e-mail, SMS, HTML, video, chat, vibration, tactile communication, or audio.

8. The method of claim 1, wherein content of the at least one advertisement is selected according to at least one of:
    a profile of a user of the communication device;
    a time of day of the predetermined time; or
    a location of the communication device at the predetermined time.

9. The method of claim 1, wherein the predetermined time is established using a calendar appointment.

10. A method for delivering advertising content from a server to a communication device, the method comprising:
    establishing, at the server, a predetermined time for an advertisement event for playing of at least one advertisement;
    transmitting from the server to the communication device advertising record data for said advertisement event, and further transmitting at least one advertisement identified in the advertising record data for playing during the advertisement event;
    receiving at the server confirmation from the communication device that an entirety of said at least one advertisement was played at the communication device;
    wherein a network service is enabled for the communication device if a minimum amount of advertisement is confirmed to have been displayed at the communication device, wherein the advertising record data comprises a corresponding identifier for each of the at least one advertisement, and wherein transmitting the at least one advertisement comprises:

receiving at the server, from the communication device, a request for an advertisement, the request comprising the corresponding identifier for said advertisement; and transmitting to the communication device, in response to said request, the advertisement identified in the request, the advertising record data transmitted to the communication device prior to the predetermined time, and the request is received after the predetermined time.

11. The method of claim 10, wherein transmitting the advertising record data and the at least one advertisement comprises transmitting the advertising record data and the at least one advertisement to a plurality of communication devices, and wherein receiving confirmation comprises receiving confirmation from at least one of the plurality of communication devices.

12. The method of claim 10, wherein at least two advertisements are transmitted to the communication device, at least one of said at least two advertisements being transmitted to the communication device prior to the predetermined time.

13. The method of claim 10, wherein the at least one advertisement is delivered in a format selected from one of e-mail, SMS, HTML, video, chat, vibration, tactile communication, or audio.

14. The method of claim 10, wherein content of the at least one advertisement is selected according to at least one of:
a profile of a user of the communication device;
a time of day of the predetermined time; or
a location of the communication device at the predetermined time.

15. The method of claim 10, wherein the predetermined time is established using a calendar appointment.

16. A computer program product comprising a tangible computer-readable medium storing program code which, when executed, causes a computing device to:

establish a predetermined time for an advertisement event for playing at least one advertisement at a communication device;

receive, at the communication device, advertising record data for said advertisement event, prior to the predetermined time;

receive, at the communication device, at least one advertisement identified in the advertising record data;

play the at least one advertisement at the communication device during the advertisement event at the predetermined time, such that an entirety of said advertisement is played at the communication device; and transmit to a server confirmation that the entirety of said advertisement was played at the communication device, wherein the advertising record data comprises an identifier corresponding to said at least one advertisement, and further wherein said at least one advertisement is received in response to a request transmitted from the communication device during said advertisement event, the request comprising the corresponding identifier.

17. A computer program product comprising a tangible computer-readable medium storing program code which, when executed, causes a computing device to:

establish, at a server, a predetermined time for an advertisement event for playing of at least one advertisement;

transmit from the server to a communication device advertising record data for said advertisement event, and further transmitting at least one advertisement identified in the advertising record data for playing during the advertisement event; and receive at the server confirmation from the communication device that an entirety of said at least one advertisement was played at the communication device;

wherein a network service is enabled for the communication device if a minimum amount of advertisement is confirmed to have been displayed at the communication device, wherein the advertising record data comprises a corresponding identifier for each of the at least one advertisement, and wherein transmitting the at least one advertisement comprises:

receiving at the server from the communication device, a request for an advertisement, the request comprising the corresponding identifier for said advertisement; and transmitting to the communication device, in response to said request, the advertisement identified in the request, the advertising record data transmitted to the communication device prior to the predetermined time, and the request is received after the predetermined time.

18. A communication device for displaying advertisements, the communication device comprising:

a display and a memory;

a processor in communication with the display and memory and with a transceiver, the processor being adapted to:

establish a predetermined time for an advertisement event for playing at least one advertisement at a communication device;

receive advertising record data for said advertisement event, prior to the predetermined time;

receive at least one advertisement identified in the advertising record data;

play the at least one advertisement at the communication device during the advertisement event at the predetermined time, such that an entirety of said advertisement is played at the communication device; and transmit to a server confirmation that the entirety of said advertisement was played at the communication device, wherein the advertising record data comprises an identifier corresponding to said at least one advertisement, and further wherein said at least one advertisement is received in response to a request transmitted from the communication device during said advertisement event to the server, the request comprising the corresponding identifier.

19. The communication device of claim 18, wherein the communication device is a wireless communication device, and a network service is enabled for the wireless communication device if a minimum amount of advertisement is confirmed to have been displayed at the communication device.

20. The communication device of claim 18, wherein the processor is configured to establish the predetermined time by saving a calendar event for said predetermined time in the memory.

* * * * *